United States Patent
Jung

(10) Patent No.: US 12,510,689 B2
(45) Date of Patent: Dec. 30, 2025

(54) OPTICAL SYSTEM AND CAMERA MODULE FOR VEHICLE

(71) Applicant: LG INNOTEK CO., LTD., Seoul (KR)

(72) Inventor: Jae Wook Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 333 days.

(21) Appl. No.: 18/020,740

(22) PCT Filed: Aug. 11, 2021

(86) PCT No.: PCT/KR2021/010643
§ 371 (c)(1),
(2) Date: Feb. 10, 2023

(87) PCT Pub. No.: WO2022/035213
PCT Pub. Date: Feb. 17, 2022

(65) Prior Publication Data
US 2024/0036232 A1   Feb. 1, 2024

(30) Foreign Application Priority Data
Aug. 11, 2020   (KR) .................. 10-2020-0100459

(51) Int. Cl.
*G02B 1/04*   (2006.01)
*G02B 9/34*   (2006.01)
(Continued)

(52) U.S. Cl.
CPC .............. *G02B 1/041* (2013.01); *G02B 9/34* (2013.01); *G03B 30/00* (2021.01); *B60R 1/27* (2022.01)

(58) Field of Classification Search
CPC ............ G02B 1/041; G02B 9/34; G02B 9/60; G02B 13/004; G02B 13/0045;
(Continued)

(56) References Cited

U.S. PATENT DOCUMENTS

| 5,862,000 A | 1/1999 | Takahashi et al. |
| 8,089,698 B1 | 1/2012 | Tang et al. |

(Continued)

FOREIGN PATENT DOCUMENTS

| CN | 102213821 A | * 10/2011 | .......... G02B 13/004 |
| CN | 102566009 A | 7/2012 | |

(Continued)

OTHER PUBLICATIONS

Dai et al. CN 102213821 A English machine translation (Year: 2011).*

(Continued)

*Primary Examiner* — Marin Pichler
(74) *Attorney, Agent, or Firm* — Birch, Stewart, Kolasch & Birch, LLP

(57) ABSTRACT

An optical system for a vehicle disclosed in an embodiment of the invention includes first to fourth lenses sequentially stacked along an optical axis in an image direction from an object side, and an aperture stop is disposed on an outer circumference between the second lens and the third lens, first lens includes an object-side first surface and an image-side second surface, the second lens includes an object-side third surface and an image-side fourth surface, and the third lens includes an object-side fifth surface and an image-side sixth surface, the third lens disposed on the image side with respect to the aperture stop have a convex object-side fifth surface and a convex image-side sixth surface on the optical axis, the first surface of the first lens on the optical axis is convex toward the object side, the third lens has a positive refractive power, and one of the first to fourth lenses is made of glass, and at least one other is made of plastic.

11 Claims, 15 Drawing Sheets

(51) Int. Cl.
*G03B 30/00* (2021.01)
*B60R 1/27* (2022.01)

(58) Field of Classification Search
CPC .......... G02B 3/0087; G02B 2003/0093; G03B 30/00; B60R 1/27
USPC .................. 359/711, 772, 774, 781, 783, 715
See application file for complete search history.

(56) References Cited

U.S. PATENT DOCUMENTS

| | | |
|---|---|---|
| 2011/0069401 A1 | 3/2011 | Jo |
| 2011/0134543 A1 | 6/2011 | Jung et al. |
| 2012/0194921 A1 | 8/2012 | Jung et al. |
| 2015/0253542 A1 | 9/2015 | Lin et al. |
| 2018/0210170 A1 | 7/2018 | Lee et al. |
| 2018/0314035 A1 | 11/2018 | Nakahara |
| 2019/0187415 A1* | 6/2019 | Wang .................... G02B 13/004 |
| 2020/0209598 A1 | 7/2020 | Sato |

FOREIGN PATENT DOCUMENTS

| | | |
|---|---|---|
| JP | 9-258098 A | 10/1997 |
| JP | 2005-351972 A | 12/2005 |
| JP | 2020-106682 A | 7/2020 |
| KR | 10-2011-0032205 A | 3/2011 |
| KR | 10-2011-0064698 A | 6/2011 |
| KR | 10-2012-0087554 A | 8/2012 |
| KR | 10-2013-0054007 A | 5/2013 |
| KR | 10-2018-0088191 A | 8/2018 |
| TW | 201425997 A | 7/2014 |

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*
Gross et al., "Handbook of Optical Systems, Aberration Theory and Correction of Optical Systems, Chapter 31: Correction of Abberations", Hanbook of Optical Systems, Aberration Theory and Correction of Optical Systems, Wiley-VCH Verlag Gmbh & Co. KGaA, vol. 3, Jan. 1, 2007, XP-002719371, pp. 215-221, 225 (34 pages total).
Gross et al., "Handbook of Optical Systems, vol. 3: Aberration Theory and Correction of Optical Systems", Handbook of Optical Systems, Wiley-VCH Verlag Gmbh & Co. KGaA, vol. 3, Jan. 1, 2007, XP-055169688, pp. 377-379 (6 pages total).
Smith, "Modern Lens Design", In Modern Lens Design: a Resource Manual, McGraw-Hill, Inc., Jan. 1, 1992, XP-055152035, pp. 25-27 (5 pages total).

* cited by examiner

OPTICAL SYSTEM AND CAMERA MODULE FOR VEHICLE

CROSS REFERENCE TO RELATED APPLICATIONS

This application is the National Phase of PCT/KR2021/010643 filed on Aug. 11, 2021, which claims priority under 35 U.S.C. § 119(a) to Patent Application No. 10-2020-0100459 filed in the Republic of Korea on Aug. 11, 2020, all of which are hereby expressly incorporated by reference into the present application.

TECHNICAL FIELD

An embodiment of the invention relates to an optical system and a camera module for a vehicle.

BACKGROUND ART

ADAS (Advanced Driving Assistance System) is an advanced driver assistance system for assisting the driver in driving, and consists of sensing the situation ahead, determining the situation based on the sensed result, and controlling the vehicle behavior based on the situation judgment. For example, an ADAS sensor device detects a vehicle ahead and recognizes a lane. Then, when the target lane, target speed, and forward target are determined, the vehicle's Electrical Stability Control (ESC), EMS (Engine Management System), and MDPS (Motor Driven Power Steering) are controlled. Typically, ADAS may be implemented as an automatic parking system, a low-speed city driving assistance system, a blind spot warning system, and the like. Sensor devices for sensing the situation ahead in ADAS include a GPS sensor, laser scanner, front radar, lidar, etc. The most representative is a front camera for capturing the front of the vehicle.

In recent years, research on a sensing system for sensing the surroundings of a vehicle for driver's safety and convenience has been accelerated. The vehicle detection system is used for various purposes, such as detecting objects around the vehicle to prevent collisions with objects not recognized by the driver, and automatically parking by detecting empty spaces, and provides the most essential data for automatic vehicle control. As such a detection system, a method using a radar signal and a method using a camera are commonly used. A camera module for a vehicle is used by being built into a front and rear surveillance camera and a dashboard camera in an automobile, and takes a picture or video of a subject. Since the vehicle camera module is exposed to the outside, photographing quality may deteriorate due to humidity and temperature. In particular, the camera module has a problem in that optical characteristics are changed depending on the ambient temperature and the material of the lens.

DISCLOSURE

Technical Problem

An embodiment of the invention may provide a vehicle optical system in which a lens made of plastic and a lens made of glass are mixed, and a camera module having the same. An embodiment of the invention may provide an optical system for a vehicle in which a lens having an aspheric surface and a lens having a spherical surface are mixed on the object side and the image side, and a camera module having the same.

Technical Solution

An optical system for a vehicle according to an embodiment of the invention comprises: a first lens, a second lens, a third lens, and a fourth lens disposed along an optical axis from an object side to an image side are sequentially stacked, and an aperture stop is disposed on an outer perimeter between the second lens and the third lens, the first lens includes an object-side first surface and an image-side second surface, the second lens includes an object-side third surface and an image-side fourth surface, the third lens includes an object-side fifth surface and an image-side sixth surface, the first surface of the first lens may be convex toward an object side on the optical axis, the third lens may have positive refractive power, one of the first to fourth lenses may be made of glass, and at least one of the other may be made of plastic.

According to an embodiment of the invention, the third lens may be made of glass, and the first, second and fourth lenses may be made of plastic. The second surface of the first lens is a concave on the optical axis, the third surface is convex and the fourth surface is concave on the optical axis, and the third lens may have a convex fifth surface and a convex sixth surface on the optical axis. The first lens may have negative refractive power, and the second and fourth lenses may have positive refractive power. According to the invention, the first lens may be made of glass, and the second to fourth lenses may be made of plastic. The first lens has a concave second surface on the optical axis, the third surface is concave and the fourth surface is concave on the optical axis, the third lens has a convex fifth surface and a convex sixth surface on the optical axis, the second lens may have negative refractive power, and the first and fourth lenses may have positive refractive power.

According to an embodiment of the invention, the second lens is made of glass, the first, third and fourth lenses are made of plastic, the first lens has a convex second surface on the optical axis, and the second lens has a concave third surface and a convex fourth surface on the optical axis, the third lens has a fifth surface convex and a sixth surface is convex on the optical axis, the second and fourth lenses have negative refractive power, and the first and third lenses may have a positive refractive power. According to the invention, the fourth lens may be made of glass, and the first to third lenses may be made of plastic. The first lens has a concave second surface on the optical axis, the third surface is convex and the fourth surface is concave on the optical axis, and the third lens has a fifth surface concave and a sixth surface convex on the optical axis, the first lens has negative refractive power, the second to fourth lenses have positive refractive power, and the fourth lens has a concave seventh surface on the object side and a convex eighth surface on the image side.

The camera module according to an embodiment of the invention includes the optical system; image sensor; a cover glass between the image sensor and the fourth lens; and an optical filter between the cover glass and the fourth lens.

Advantageous Effects

The optical system according to an embodiment of the invention may suppresses lens deformation at high temperatures by mixing plastic lenses and glass lenses, while reducing the weight of modules and increasing unit cost due to increased material costs. According to the optical system according to an embodiment of the invention, lens deformation or deterioration of resolving power may be suppressed at high temperatures, and stable optical performance may be implemented even when ambient temperature changes. According to an embodiment of the invention, the optical reliability of the vehicle optical system and camera module can be improved. In addition, the reliability of the camera module and the vehicle camera device having the same can be improved.

BEST MODE

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. In addition, several embodiments described below can be combined with each other unless specifically stated that they cannot be combined with each other. In addition, unless otherwise specified, descriptions for other embodiments may be applied to missing parts in the description of any one of several embodiments.

Embodiment

Figure 1:
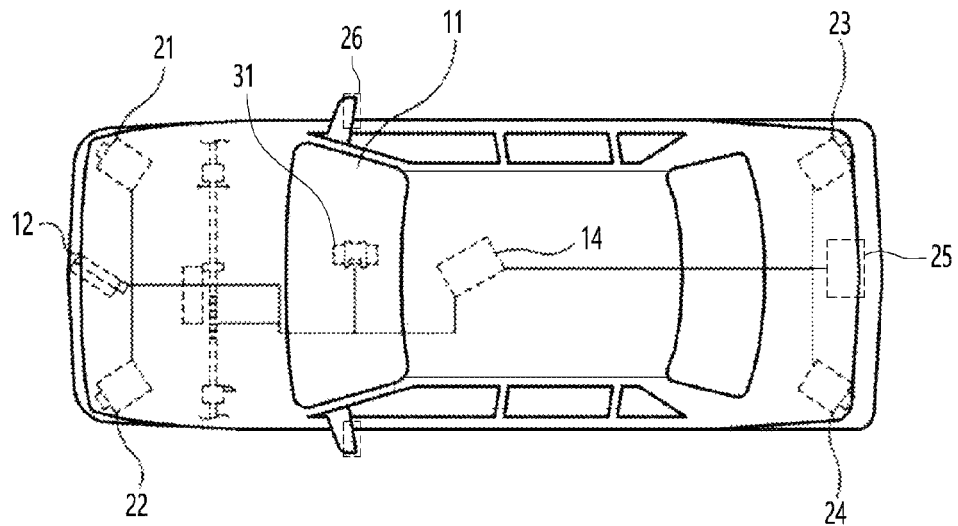
FIG. 1 is an example of a plan view of a vehicle to which a camera module or optical system according to an embodiment of the invention is applied.
Figure 2:
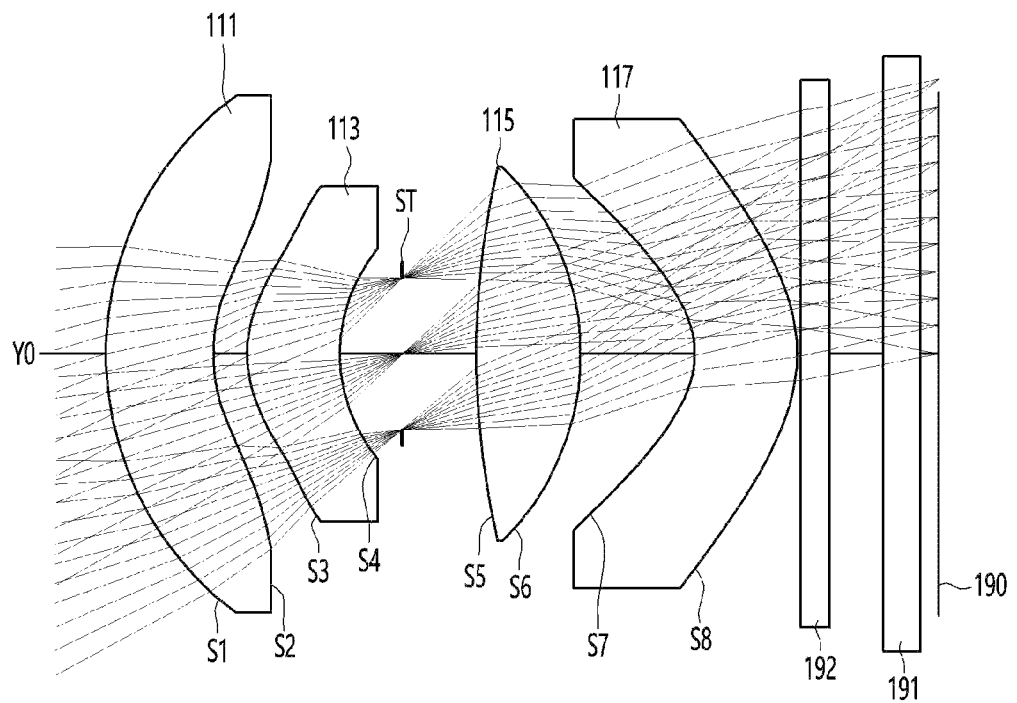
FIG. 2 is a side cross-sectional view showing an optical system for a vehicle according to a first embodiment of the invention.
Figure 3:
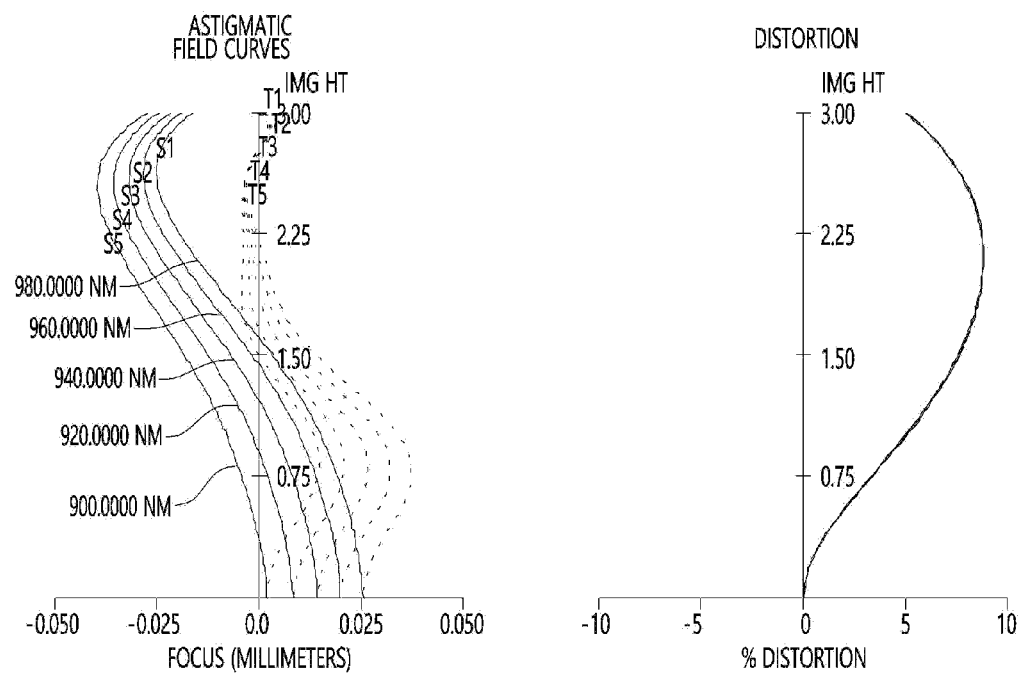
FIGS. 3 to 5 are diagrams showing astigmatic field curves and distortion graphs at room temperature, low temperature, and high temperature in the optical system of FIG. 2.
Figure 4:
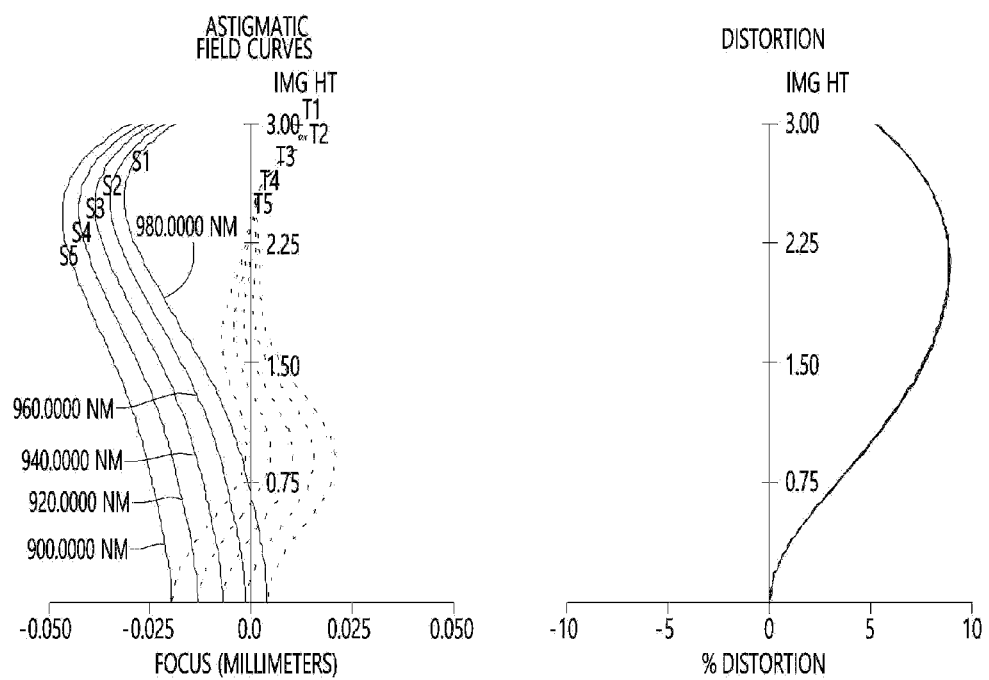
Figure 5:
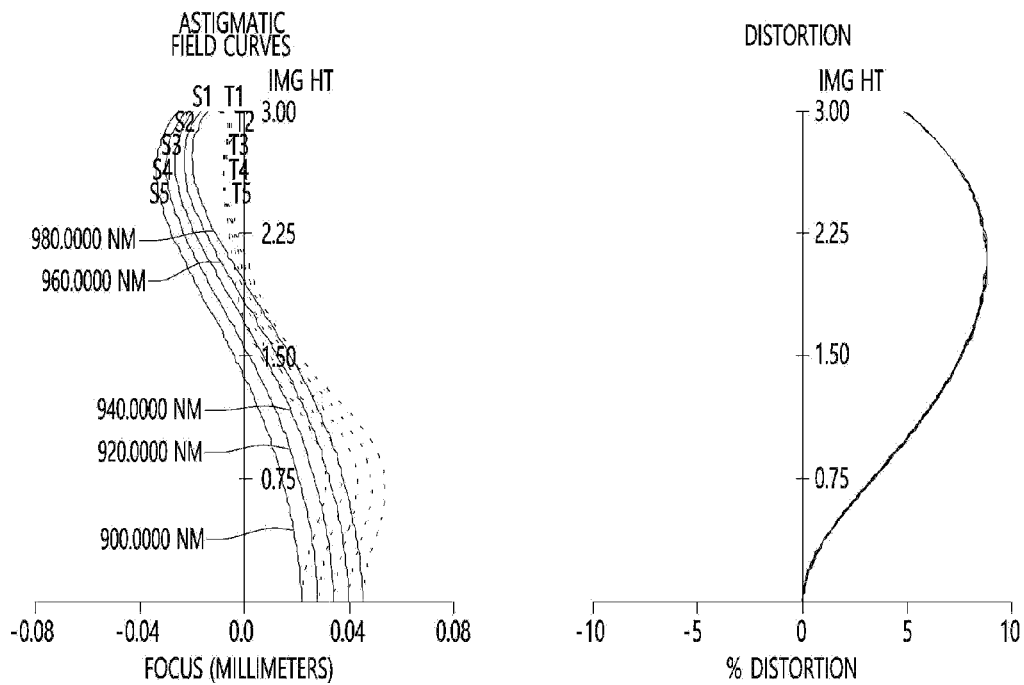

FIG. 1 is an example of a plan view of a vehicle to which a camera module or optical system according to an embodiment of the invention is applied, FIG. 2 is a side cross-sectional view showing an optical system for a vehicle according to a first embodiment of the invention, FIGS. 3 to 5 are a diagram showing astigmatic field curves and distortion graphs at room temperature, low temperature and high temperature in the optical system of FIG. 2, and FIGS. 6 to 8 is graph showing diffraction MTF (Modulation transfer function) at room temperature, low temperature and high temperature in the optical system of FIG. 2.

Referring to FIG. 1, a vehicle camera system according to an embodiment of the invention includes an image generating portion 11, a first information generating portion 12, a second information generating portion 21, 22, 23, 24, 25, and 26 and a control portion 14. The image generating portion 11 may include at least one camera module 31 disposed in the vehicle, and captures the front side of the vehicle and/or the driver to generate a front image of the vehicle or an image inside the vehicle. In addition, the image generating portion 11 may generate an image of the surroundings of the own vehicle by capturing not only the front of the own vehicle but also the surroundings of the own vehicle in one or more directions using the camera module 31. Here, the front image and the surrounding image may be digital images, and may include color images, black and white images, and infrared images. In addition, the front image and the surrounding image may include still images and moving images. The image generating portion 11 provides the driver's image, front image, and surrounding image to the control portion 14. Subsequently, the first information generating portion 12 may include at least one radar or/and camera disposed in the own vehicle, and detects the front side of the own vehicle to generate first detection information. Specifically, the first information generating portion 12 is disposed in the own vehicle and generates first detection information by detecting the location and speed of vehicles located in front of the own vehicle, presence and location of pedestrians, and the like.

Using the first detection information generated by the first information generating portion 12, control may be performed to maintain a constant distance between the host vehicle and the preceding vehicle, and it is possible to increase the stability of vehicle operation in a predetermined specific case, such as when the driver wants to change the driving lane of the vehicle or when parking in reverse. The first information generating portion 12 provides the first sensing information to the control portion 14. The second information generating portions 21, 22, 23, 24, 25, and 26 detect each side of the host vehicle based on the front image generated from the image generating portion 11 and the first detection information generated from the first information generating portion 12 to generate second sensing information. Specifically, the second information generating portions 21, 22, 23, 24, 25, and 26 may include at least one radar or/and camera disposed in the host vehicle, and may include locations of vehicles located on the side of the host vehicle, and may be sensed speed and captured an image. Here, the second information generating portions 21, 22, 23, 24, 25, and 26 may be disposed at both front corners, side mirrors, and rear center and rear corners of the vehicle, respectively. The vehicle camera system may include a camera module having an optical system described in the following embodiment(s), and may protect vehicles and objects from autonomous driving or surrounding safety by providing or processing information acquired through driver monitoring, the front, rear, side, or corner regions of the own vehicle to the user.

A plurality of optical systems of the camera module according to an exemplary embodiment of the invention may be mounted in a vehicle in order to enhance safety regulation, self-driving function, and convenience. In addition, the optical system of the camera module is applied to a vehicle as a component for controlling a lane keeping assistance system (LKAS), a lane departure warning system (LDWS), and a driver monitoring system (DMS). Such a camera module for a vehicle may realize stable optical performance even when the ambient temperature changes and provides a module with a competitive price, thereby securing reliability of vehicle components.

In the description of the invention, the first lens means the lens closest to the object side, and the last lens means the lens closest to the image side (or a surface of sensor). The last lens may include a lens adjacent to the image sensor. Unless otherwise specified in the description of the invention, all units for the radius, thickness/distance, TTL, etc. of the lens are mm. In this specification, the shape of the lens is shown based on the optical axis of the lens. For example, a fact that the object side of the lens is convex or concave means that the vicinity of the optical axis is convex or concave on the side of the object of the lens, and that the periphery of the optical axis is not convex or concave. Therefore, even when it is described that the object side of the lens is convex, the portion around the optical axis on the object side of the lens may be concave or vice versa. In this specification, it is noted that the thickness and radius of curvature of the lens are measured based on the optical axis of the lens. That is, the convex surface of the lens means that the surface of the lens in the region corresponding to the optical axis has a convex shape, and the concave surface of the lens means that the surface of the lens in the region corresponding to the optical axis has a concave shape. Also, the "object-side surface" may refer to a surface of a lens facing the object side based on an optical axis, and the "image-side surface" may refer to a surface of a lens facing an imaging surface based on an optical axis.

An optical system according to an embodiment of the invention may include a lens made of glass and a lens made of plastic. The optical system may include at least one glass lens and at least three plastic lenses. Among the total lenses in the optical system, glass-made lenses may account for 30% or less, for example, 25% or less, and plastic lenses may account for 70% or more, for example, 75% or more of the total lenses. Here, the lens disposed on the image side with respect to the aperture stop ST may have a convex object-side surface and a convex image-side surface, and may have positive (+) refractive power. When the lens disposed on the object side of the aperture stop ST is made of glass, it may have negative refractive power, and the lens disposed on the image side of the aperture stop ST may have positive (+) refractive power. When the lens disposed above the aperture stop ST is made of glass, the lens disposed on the object side with respect to the aperture stop ST may have a positive (+) refractive power, and the lens disposed on the image side with respect to the aperture stop ST may have a positive (+) refractive power.

Referring to FIG. 2, in the optical system, at least three or more lenses 111, 113, 115, and 117 may be stacked, and for example, three to seven lenses or three to seven lenses may be stacked. The optical system may include at least three or more solid lenses, and the solid lens may include at least two plastic lenses and at least one glass lens. In the optical system according to an embodiment of the invention, two or more plastic lenses and glass lenses may be smaller than the number of plastic lenses. Accordingly, a lens having an aspheric surface and a lens having a spherical surface may be mixed, and a change in properties of a material according to temperature may be suppressed and a deterioration in optical performance (MTF) may be prevented.

The optical system may include a first lens 111, a second lens 113, a third lens 115, and a fourth lens 117 stacked along an optical axis Y0 from an object side to an image side. The optical system or a camera module having the same may include an image sensor 190, and a cover glass 191 and an optical filter 192 on an upper side of the image sensor 190. The optical system may include an aperture stop ST for adjusting the amount of incident light. A lens group disposed on the object side with respect to the aperture stop ST may be divided into a first lens group and the lens group disposed on the image side with respect to the aperture stop ST may be divided into a second lens group. That is, the first lens group may include the first and second lenses 111 and 113, and the second lens group may include the third and fourth lenses 115 and 117. The aperture stop ST may be disposed on the outer circumference between the second lens 113 and the third lens 115, or the lower circumference of the second lens 113 or the upper circumference of the third lens 115 functions as an aperture stop.

The first lens 111 is a lens closest to the subject and may include a plastic material. The first lens 111 includes a first surface 51 on which light is incident and a second surface S2 on which light is emitted, and both the first surface 51 and the second surface S2 may be aspheric surfaces. The first lens 111 may have negative refractive power and a refractive index of less than 1.6. The first lens 111 may have the lowest refractive index among lenses in the optical system. The first surface 51 of the first lens 111 may be convex toward the object along the optical axis Y0, and the second surface S2 may be concave toward the object along the optical axis Y0. The first lens 111 may have a meniscus shape in which both sides 51 and S2 are convex from the optical axis Y0 toward the object side. As another example, the second surface S2 may be flat. The first lens 111 may be made of plastic to prevent discoloration when the camera module is exposed to light from inside or outside the vehicle, and may be made of glass or plastic when the camera module is placed inside the vehicle.

The second lens 113 may be made of a plastic material. The second lens 113 may have positive (+) refractive power and may be formed of a material having a refractive index of 1.6 or higher. The refractive index of the second lens 113 may be greater than the refractive index of the first lens 111 and may be less than the refractive index of the third lens 115. The second lens 113 may be disposed between the first lens 111 and the third lens 115. The second lens 113 includes a third surface S3 through which light is incident and a fourth surface S4 through which light is emitted, and both of the third surface S3 and the fourth surface S4 may be aspheric surfaces. The third surface S3 may be convex toward the object along the optical axis Y0, and the fourth surface S4 may be concave toward the object along the optical axis Y0. The second lens 113 may have a meniscus shape in which both sides of the optical axis Y0 are convex toward the object side. As another example, the second lens 113 may be made of glass.

The third lens 115 may be made of glass. The third lens 115 may have negative (−) refractive power and may be formed of a material having a refractive index of 1.7 or higher. The refractive index of the third lens 115 may be greater than those of the other lenses 111, 113, and 117. The third lens 115 may have the highest refractive index among lenses in the optical system. The third lens 115 is disposed between the second and fourth lenses 113 and 117 to reduce problems caused by thermal expansion. The third lens 115 has a high refractive index of a glass material and has a refractive power with a high dispersion value, so that it may improve the aberration of incident light. The third lens 115 includes a fifth surface S5 through which light is incident and a sixth surface S6 through which light is emitted, and both the fifth surface S5 and the sixth surface S6 may be spherical surface. The fifth surface S5 may be convex toward the object in the optical axis Y0, and the sixth surface S6 may be convex toward the image side on the optical axis Y0. Both sides of the third lens 115 may be convex along the optical axis.

The fourth lens 117 is a lens closest to the image sensor 190 and may be made of a plastic material. The fourth lens 117 may have positive (+) refractive power and may be formed of a material having a refractive index of 1.6 or more and less than 1.7. The refractive index of the fourth lens 117 may be greater than the refractive index of the first lens 111 and may be less than the refractive index of the third lens 115. The fourth lens 117 includes a seventh surface S7 through which light is incident and an eighth surface S8 through which light is emitted, and both the seventh surface S7 and the eighth surface S8 may be aspheric surfaces. The seventh surface S7 may be concave toward the image side on the optical axis Y0, and the eighth surface S8 may be convex toward the image side on the optical axis Y0. The fourth lens 117 may have a meniscus shape convex toward the image side from the optical axis Y0. The fourth lens 117 may be made of glass.

Each of the lenses 111, 113, 115, and 117 may include an effective region having an effective diameter through which light is incident, and a flange portion outside the effective region, which is an ineffective region. The ineffective region may be a region in which light is blocked by a spacer or a light blocking film. The effective diameter of the first lens 111 may be larger than the effective diameter of the second lens 113 and may be larger than the effective diameter of the third lens 115. Here, the ratio of the lenses disposed on the image side of the aperture stop ST to the lenses disposed on the object side may be 1:1.

The image sensor 190 may perform a function of converting light passing through lenses into image data. Here, a housing or lens holder may be disposed outside the optical system, and a sensor holder is disposed on a lower portion of the optical system and may surrounds the image sensor 190 and protects the image sensor 190 from external foreign substances or shocks. The image sensor 190 may be any one of a Charge Coupled Device (CCD), Complementary Metal-Oxide Semiconductor (CMOS), CPD, and CID. When the number of image sensors 190 is plural, one may be a color (RGB) sensor and the other may be a black and white sensor. The optical filter 192 may be disposed between the fourth lens 117 and the image sensor 190. The optical filter 192 may filter light corresponding to a specific wavelength range with respect to light passing through the lenses 111, 113, 115, and 117. The optical filter 192 may be an infrared (IR) blocking filter that blocks infrared rays or an ultraviolet (UV) blocking filter that blocks ultraviolet rays, but the embodiment is not limited thereto. The optical filter 192 may be disposed on the image sensor 190. The cover glass 191 is disposed between the optical filter 192 and the image sensor 192, protects an upper portion of the image sensor 192, and may prevent deterioration in reliability of the image sensor 192.

A vehicle camera module according to an embodiment of the invention may not have a driving member (not shown) around the optical system. That is, since the optical system is disposed in the vehicle, it is difficult to control the focus by moving the lens barrel supporting the optical system on the optical axis direction or/and in a direction perpendicular to the optical axis direction with the driving member, so the driving member may be removed. The driving member may be an actuator or a piezoelectric element for an auto focus (AF) function or/and an optical image stabilizer (OIS) function.

Table 1 shows lens data in the optical system of FIG. 1.

TABLE 1

|  | Surface | Shape | Radius of curvature (mm) | Thickness (mm)/ Distance (mm) | Refractive index (Nd) | Abbe number (Vd) | Focal length (mm) | semi-aperture (mm) |
|---|---|---|---|---|---|---|---|---|
| Object plane | 0 | Flat | 1.E+18 | 640.000 |  |  |  |  |
| Lens 1 | S1 | Asphere | 2.936 | 1.168 | 1.526 | 55.728 | −7.418 | 2.564 |
|  | S2 | Asphere | 1.446 | 0.366 |  |  |  | 2.133 |
| Lens 2 | S3 | Asphere | 1.335 | 1.008 | 1.632 | 19.246 | 4.492 | 1.662 |
|  | S4 | Asphere | 1.746 | 0.698 |  |  |  | 1.098 |
| Stop |  | Flat | 1.E+18 | 0.794 |  |  |  | 0.828 |
| Lens 3 | S5 | Sphere | 9.152 | 1.151 | 1.729 | 44.850 | 3.136 | 1.765 |
|  | S6 | Sphere | −2.882 | 1.243 |  |  |  | 1.858 |
| Lens 4 | S7 | Asphere | −1.186 | 1.116 | 1.632 | 19.246 | 11.933 | 1.832 |
|  | S8 | Asphere | −1.406 | 0.050 |  |  |  | 2.342 |
| BPF | Sa | Flat | 1.E+18 | 0.300 | 1.508 | 44.850 |  |  |
|  | Sb | Flat | 1.E+18 | 0.600 |  |  |  |  |
| Cover glass | Sc | Flat | 1.E+18 | 0.400 | 1.508 | 44.850 |  |  |
|  | Sd | Flat | 1.E+18 | 0.200 |  |  |  |  |
| CIS |  | Flat | 1.E+18 | 0.000 |  |  |  |  |

In Table 1, Sa and Sb mean the incident side and exit side of the optical filter, Sc and Sd mean the incident side and exit side of the cover glass, and CIS means the image sensor. The refractive indices of the first to fourth lenses 111, 113, 115, and 117 are the refractive index at 587 nm, and in the Abbe number of the first to fourth lenses 111, 113, 115, and 117 at the d-line (587 nm), the Abbe numbers of the second lens 113 and the fourth lens 117 is less than 30, and the Abbe number of the first lens 111 is 50 or more. Also, a distance between the first lens 111 and the second lens 113 on the optical axis Y0 may be smaller than the distance between the third lens 115 and the fourth lens 117. A distance between the third and fourth lenses 115 and 117 on the optical axis Y0 may be smaller than a distance between the second lens 113 and the third lens 115. The distance between the first and second lenses 111 and 113 may be less than 1 mm or less than 0.5 mm. The distance between the third and fourth lenses 115 and 117 and the distance between the second and third lenses 113 and 115 may be greater than or equal to 1 mm. The center thickness of the first, third, and fourth lenses 111, 115, and 117 is the thickness on the optical axis, and may be greater than or equal to 1 mm, for example, in the range of 1 mm to 2 mm, and may be greater than the center thickness of the second lens 113. Comparing the focal lengths as absolute values, the focal length of the first lens 111 may be larger than that of the second and third lenses 113 and 115 and smaller than that of the fourth lens 117. Compared with the absolute value of the radius of curvature (unit, mm), the radius of curvature of the fifth surface S5 of the third lens 115 may be the largest among the lenses of the optical system, and is 8 mm or more, for example, in the range of 9 mm to 10 mm. The radius of curvature of the fifth surface S5 may be three or more times, for example, three to four times the radius of curvature of the sixth surface S6. The radius of curvature of the fifth surface S5 may be three or more times, for example, three to four times the radius of curvature of the first surface S1. The radius of curvature of the first surface S1 may be greater than that of the second surface S2, the third surface S3, the fourth surface S4, and the seventh and eighth surfaces S7 and S8. In the Abbe number, the first lens 111 is 50 or more, and may be larger than the Abbe number of other lenses. The Abbe numbers of the second and fourth lenses 113 and 117 may be 25 or less. The Abbe number of the third lens 115 may be greater than the Abbe number of the first lens 111 and may be smaller than the Abbe number of the second and fourth lenses 113 and 117. The semi-aperture represents the effective radius of each lens. Comparing the effective radii, the effective radii of the first and second surfaces S1 and S2 of the first lens 111 may be greater than the effective radii of the third and fourth surfaces S3 and S4 of the second lens 113, and may be larger than the effective radius of the fifth and sixth surfaces S5 and S6 of the third lens 115 and may be 2 mm or more. The effective radius of the eighth surface S8 of the fourth lens 117 may be larger than the effective radius of the seventh surface S7 and may be 2 mm or more.

The optical system according to the first embodiment of the invention may include at least one glass lens and at least three plastic lenses. Among the total lenses in the optical system, glass-made lenses may account for 30% or less, for example, 25% or less, and plastic lenses may account for 70% or more, for example, 75% or more of the total lenses. Here, the object-side surface and the image-side surface of the lens disposed on the image side with respect to the aperture stop ST are convex, and may have positive (+) refractive power. When the lens disposed on the object side of the aperture stop ST is made of glass, it may have negative refractive power, and the lens disposed on the image side of the aperture stop ST may have positive (+) refractive power. When the lens disposed on the image side of the aperture stop ST is made of glass, the lens disposed on the object side of with respect to the aperture stop ST may have a positive (+) refractive power, and the lens disposed on the image side of the aperture stop ST may have a positive (+) refractive power. The number of object-side lenses and the number of image-side lenses based on the aperture stop may be the same.

Table 2 is the aspheric coefficient of each surface of each lens in the optical system of FIG. 1.

TABLE 2

| Item | Sur- face | Aspherical surface coefficient | | | | |
|---|---|---|---|---|---|---|
|  |  | K | A | B | C | D | E |
| Lens 1 | S1 | −3.0936 | 0.0055 | 0.0008 |  |  |  |
|  | S2 | −2.1145 | −0.0375 | 0.0032 |  |  |  |

TABLE 2-continued

| Item | Sur-face | Aspherical surface coefficient | | | | | |
|---|---|---|---|---|---|---|---|
| | | K | A | B | C | D | E |
| Lens 2 | S3 | −0.7343 | −0.0458 | −0.0023 | −0.0046 | | |
| | S4 | −0.3659 | 0.0242 | −0.0207 | −0.0020 | 0.0021 | |
| Stop | | | | | | | |
| Lens 3 | S5 | | | | | | |
| | S6 | | | | | | |
| Lens 4 | S7 | −0.7910 | 0.0301 | 0.0327 | −0.0214 | 0.0058 | −0.0006 |
| | S8 | −1.4664 | 0.0207 | 0.0009 | 0.0013 | −0.0011 | 0.0002 |

Figure 6:
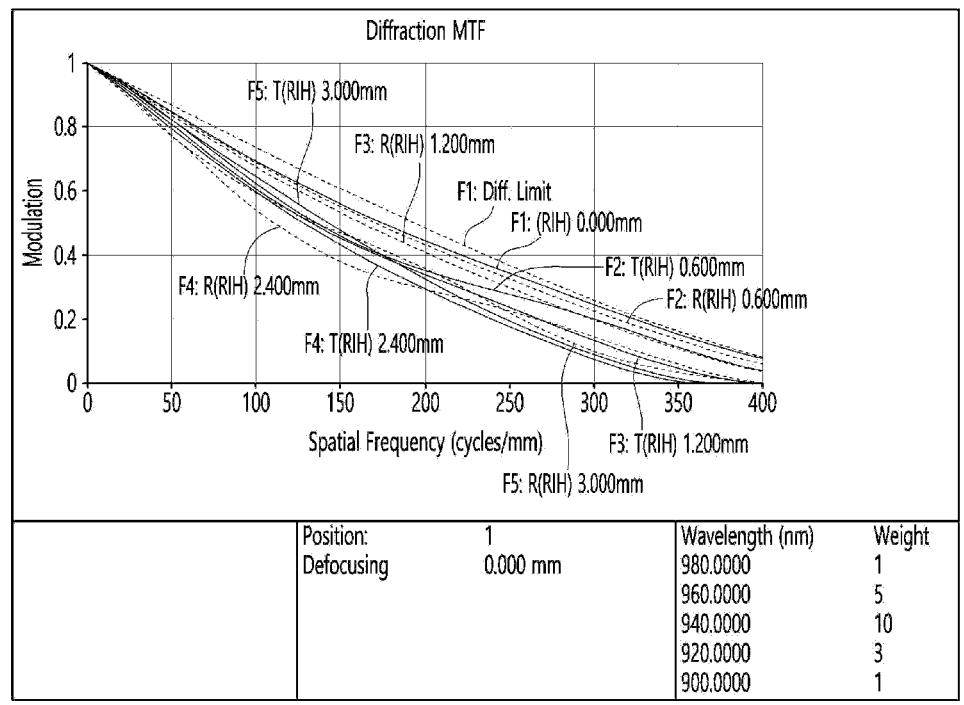
FIGS. 6 to 8 are graphs showing diffraction MTF (Modulation Transfer Function) at room temperature, low temperature and high temperature in the optical system of FIG. 2.
Figure 7:
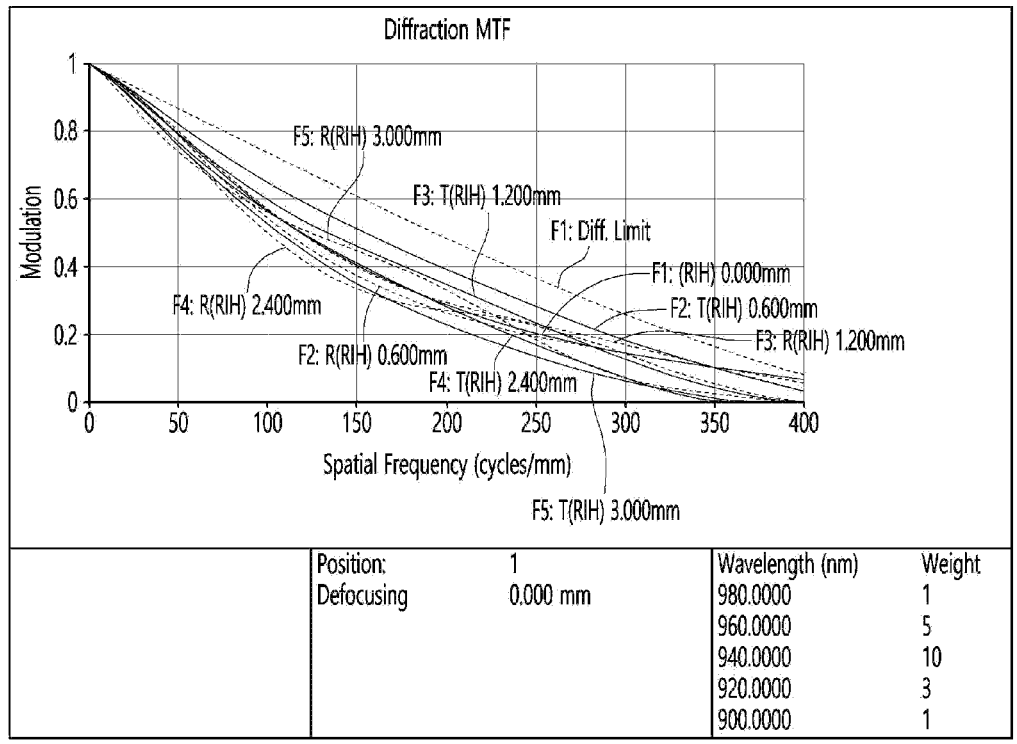
Figure 8:
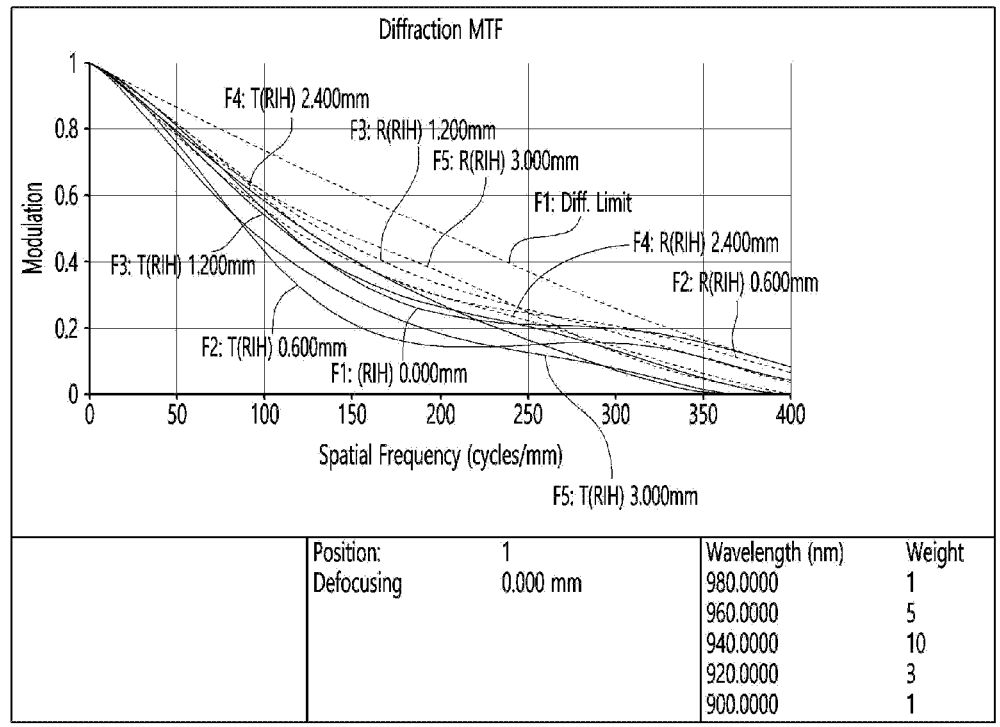

FIGS. 3 to 5 are diagrams of astigmatic field curves and distortion graphs at room temperature, low temperature, and high temperature in the optical system of FIG. 1, and FIGS. 6 to 8 are graphs showing diffraction MTF (Modulation Transfer Function) at room temperature, low temperature and high temperature in the optical system of FIG. 2. Here, the normal temperature is 22 degrees, the low temperature is −40 degrees, and the high temperature is 80 degrees. As shown in FIGS. 3 to 5, it may be seen that there is no significant change in the astigmatic field curves at room temperature, low temperature, and high temperature, and no change in distortion graph at room temperature, low temperature, and high temperature. As shown in FIGS. 6 to 8, it may be seen that the diffraction MTF (Modulation transfer function) at room temperature, low temperature, and high temperature in the optical system is data when the aperture stop ST is open based on F1 (Diff Limit), and the change in the data according to the temperature change is not large, less than 10%. Referring to FIGS. 9 to 15 for the second embodiment.

Figure 9:
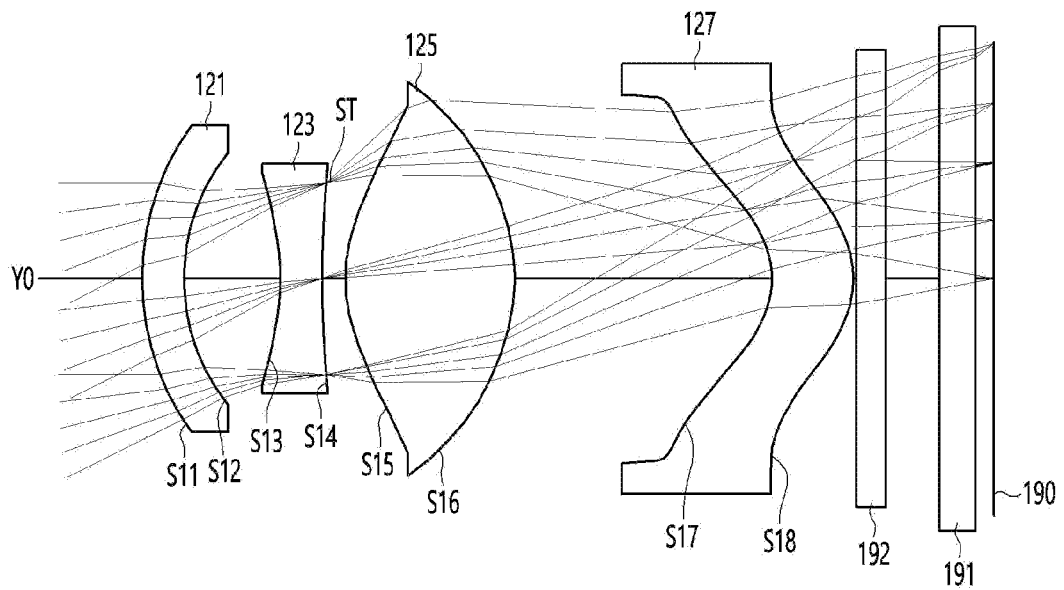
FIG. 9 is a side cross-sectional view showing an optical system for a vehicle according to a second embodiment of the invention.

Referring to FIG. 9, the optical system may include a first lens 121, a second lens 123, a third lens 125, and a fourth lens 127 stacked along an optical axis from an object side to an image side. The optical system or a camera module having the same may include an image sensor 190, a cover glass 191, and an optical filter 192 on the image sensor 190. The optical system may include an aperture stop ST for adjusting the amount of incident light. A lens group disposed on the object side with respect to the aperture stop ST may be divided into a first lens group and the lens group disposed on the image side with respect to the aperture stop ST may be divided into a second lens group. That is, the first lens group may include the first and second lenses 121 and 123, and the second lens group may include the third and fourth lenses 125 and 127. The aperture stop ST may be disposed on the outer circumference between the second lens 123 and the third lens 125, or the lower circumference of the second lens 123 or the upper circumference of the third lens 125 functions as an aperture stop.

The first lens 121 is a lens closest to the subject and may include a glass material. The first lens 121 includes a first surface S11 on which light is incident and a second surface S12 on which light is emitted, and both the first surface S11 and the second surface S12 are spherical surface. The first lens 121 may have a positive (+) refractive power, and a refractive index of 1.6 or more, for example, 1.7 or more. The first lens 121 may have the highest refractive index among lenses in the optical system. The first surface S11 of the first lens 121 may be convex toward the object on the optical axis Y0, and the second surface S12 may be concave toward the object side on the optical axis Y0. The first lens 121 may have a meniscus shape in which both sides S11 and S12 are convex from the optical axis Y0 toward the object side. The first lens 121 may be made of plastic to prevent discoloration when the camera module is exposed to light from inside or outside the vehicle, and may be made of glass or plastic when the camera module is placed inside the vehicle. Since the first lens 121 is made of a glass material, expansion due to external heat or internal heat may be reduced. The first lens 121 has a high refractive index of a glass material and has a refractive power with a high dispersion value, so that it may improve the aberration of incident light.

The second lens 123 may be made of a plastic material. The second lens 123 may have negative (−) refractive power and may be formed of a material having a refractive index of 1.6 or more, for example, in the range of 1.6 to 1.7. The second lens 123 may be disposed between the first lens 121 and the third lens 125. The second lens 123 includes a third surface S13 on which light is incident and a fourth surface S14 on which light is emitted, and both the third surface S13 and the fourth surface S14 may aspheric surfaces. The third surface S13 is concave toward the image side on the optical axis Y0, and the fourth surface S14 may be concave or flat toward the object in the optical axis Y0.

The third lens 125 may be made of a plastic material. The third lens 125 may have positive (+) refractive power and may be formed of a material having a refractive index of less than 1.6. The third lens 125 includes a fifth surface S15 on which light is incident and a sixth surface S16 on which light is emitted, and both the fifth surface S15 and the sixth surface S16 may be aspheric surfaces. The fifteenth surface S5 may be convex toward the object on the optical axis Y0, and the sixteenth surface S6 may be convex toward the image side on the optical axis Y0. Both sides of the third lens 125 may be convex on the optical axis. At least one or both of the fifth surface S15 and the sixth surface S16 of the third lens 125 may have at least one inflection point.

The fourth lens 127 is a lens closest to the image sensor 190 and may be made of a plastic material. The fourth lens 127 may have positive (+) refractive power and may be formed of a material having a refractive index of 1.6 or more and less than 1.7. The fourth lens 127 includes a seventh surface S17 on which light is incident and an eighth surface S18 on which light is emitted, and both the seventh surface S17 and the eighth surface S18 may be aspheric surfaces. The seventh surface S17 may be concave toward the image side on the optical axis Y0, and the eighth surface S8 may be convex toward the image side on the optical axis Y0. The fourth lens 127 may have a meniscus shape convex toward the image side. At least one or both of the seventh surface S17 and the eighth surface S18 of the fourth lens 127 may have at least one inflection point. The fourth lens 127 may be made of glass.

Each of the lenses 121, 123, 125, and 127 may include an effective region having an effective diameter through which light is incident and a flange portion outside the effective region, which is an ineffective region. The ineffective region may be a region in which light is blocked by a spacer or a light blocking film. The effective diameter of the first lens 121 may be greater than the effective diameter of the second lens 123 and may be smaller than the effective diameter of the third lens 125. Here, the ratio of the lenses disposed on the image side of the aperture stop ST to the lenses disposed on the object side may be 1:1.

For the image sensor 190, the optical filter 192, and the cover glass 191, the description of the first embodiment will be referred to. In the vehicle camera module of the second embodiment, there may be no driving member (not shown) around the optical system. That is, since the optical system is disposed in the vehicle, it is difficult to control the focus by moving the lens barrel supporting the optical system in the optical axis direction or/and in a direction perpendicular to the optical axis direction with the driving member, so the driving member may be removed. The driving member may be an actuator or a piezoelectric element for an auto focus (AF) function or/and an optical image stabilizer (OIS) function.

Table 3 shows lens data in the optical system of FIG. 9.

TABLE 3

| Surface | | Shape | Radius of curvature (mm) | Thickness (mm)/ Distance(mm) | Refractive index (Nd) | Abbe number (Vd) | Focal length (mm) | semi-aperture (mm) |
|---|---|---|---|---|---|---|---|---|
| Object plane | 0 | Flat | 1.E+18 | 640.000 | | | | |
| Lens 1 | S11 | Sphere | 3.540 | 0.500 | 1.744 | 44.850 | 42.699 | 1.797 |
| | S12 | Sphere | 3.757 | 1.125 | | | | 1.547 |
| Lens 2 | S13 | Asphere | −2.389 | 0.500 | 1.671 | 19.200 | −3.952 | 1.347 |
| | S14 | Asphere | −44.540 | 0.050 | | | | 1.219 |
| Stop | | Flat | 1.E+18 | 0.218 | | | | 1.220 |
| Lens 3 | S15 | Asphere | 2.068 | 1.990 | 1.531 | 55.900 | 2.694 | 2.226 |
| | S16 | Asphere | −2.939 | 3.028 | | | | 2.312 |
| Lens 4 | S17 | Asphere | −1.124 | 0.960 | 1.671 | 19.200 | 10.762 | 2.140 |
| | S18 | Asphere | −1.289 | 0.050 | | | | 2.298 |
| BPF | Sa | Flat | 1.E+18 | 0.300 | 1.508 | 44.850 | | |
| | Sb | Flat | 1.E+18 | 0.600 | | | | |
| Cover glass | Sc | Flat | 1.E+18 | 0.400 | 1.508 | 44.850 | | |
| | Sd | Flat | 1.E+18 | 0.200 | | | | |
| Image sensor | | Flat | 1.E+18 | 0.000 | | | | |

In Table 3, Sa and Sb may be the incident-side and exit-side surfaces of the optical filter, and Sc and Sd may be the incident-side and exit-side surfaces of the cover glass. The refractive indices of the first to fourth lenses 121, 123, 125, and 127 is the refractive index at 587 nm, and in the Abbe number of the first to fourth lenses 121, 123, 125, and 127 at d-line (587 nm), the Abbe numbers of the second lens 123 and the fourth lens 127 may be less than the Abbe number of the third lens 125 may be greater than 50, and the Abbe number of the first lens 121 may be greater than the median value of the Abbe number of the third lens 125 and the second lens 123, for example, greater than 40 and less than 50. In the Abbe number, the third lens 125 has an Abbe number of 50 or more, and may be greater than the Abbe number of other lenses. Abbe numbers of the second and fourth lenses 123 and 127 may be 25 or less. In addition, the distance between the first lens 121 and the second lens 123 on the optical axis is greater than the distance between the second and third lenses 123 and 125, and may be smaller than the distance between the third lens 125 and the fourth lens 127. The distance between the third and fourth lenses 125 and 127 may be larger than the distance between the second lens 123 and the third lens 125. The distance between the first and second lenses 121 and 123 may be greater than or equal to 1 mm, for example, in the range of 1 mm to 1.5 mm. The distance between the second and third lenses 123 and 125 may be less than 1 mm, and the distance between the third and fourth lenses 125 and 127 may be 3 times or more of the distance between the second and third lenses 123 and 125, for example, in a range of 3 times to 5 times. When the focal lengths are compared as absolute values, the focal length of the first lens 121 may be larger than those of the second, third, and fourth lenses 123, 125, and 127 and may be 40 or more. The center thickness of the third lens 125 is thicker than other lenses or is the thickest, and may be 1 mm or more, for example, 1.5 mm or more. A center thickness of the first and second lenses 121 and 123 may be less than 1 mm. The center thickness of the fourth lens 127 may be larger than that of the first and second lenses 121 and 123 and smaller than that of the third lens 125. Compared with the absolute value of the radius of curvature (unit, mm), the radius of curvature of the fourth surface S14 of the second lens 123 is the largest among the lenses in the optical system, and may be 40 mm or more, for example, in the range of 40 mm to 50 mm. The radius of curvature of the fourth surface S14 may be 10 times or more, for example, in a range of 10 to 20 times the radius of curvature of the first and second surfaces S11 and S12. The radius of curvature of the fifth and sixth surfaces S15 and S16 may be smaller than that of the first and second surfaces S11 and S12 and greater than the radius of curvature of the seventh and eighth surfaces S17 and S18. The radius of curvature of the second surface S12 may be greater than that of the first surface S11, the third surface S13, the fourth surface S14, and the seventh and eighth surfaces S17 and S18. The radius of curvature of the seventh and eighth surfaces S17 and S18 is less than 2 mm and greater than 1 mm, and the radius of curvature of the fifth and sixth surfaces S15 and S16 is greater than 2 mm and less than 3 mm. The radius of curvature of the first and second surfaces S13 and S14 is larger than that of the third surface S13 and may be in the range of 3 mm to 4 mm. The semi-aperture represents the effective radius of each lens. Comparing the effective radii, the effective radii of the first and second surfaces S11 and S12 of the first lens 121 are greater than the effective radii of the third and fourth surfaces S13 and S14 of the second lens 123, and may be smaller than the effective radius of the fifth and sixth surfaces S15 and S16 of the third lens 125 and may be less than 2 mm. The effective radius of the eighth surface S18 of the fourth lens 127 may be smaller than the effective radius of the seventh surface S17, and the fifth, sixth, seventh, and the radii of curvature of the fifth to eighth surfaces S15, S16, S17, and S18 may be greater than or equal to 2 mm.

The optical system according to the second embodiment of the invention may include at least one glass lens and at least three plastic lenses. Among the total lenses in the optical system, glass-made lenses may account for 30% or less, for example, 25% or less, and plastic lenses may account for 70% or more, for example, 75% or more of the total lenses. Here, the lens disposed on the image side with respect to the aperture stop ST may have the convex object-side surface and the convex image-side surface, and may have positive (+) refractive power. When the lens disposed on the object side of the aperture stop ST is made of glass, it may have negative refractive power, and the lens disposed on the image side of the aperture stop ST may have positive (+) refractive power. When the lens disposed on the image side of the aperture stop ST is made of glass, the lens disposed on the object side with respect to the aperture stop ST may have a positive (+) refractive power, and the lens disposed the image side of the aperture stop ST may have a positive (+) refractive power. The number of object-side lenses and the number of image-side lenses based on the aperture stop may be the same.

Table 4 is the aspherical surface coefficient of each lens surface in the optical system of FIG. 9.

TABLE 4

| | | Aspherical surface coefficient | | | | | |
|---|---|---|---|---|---|---|---|
| Item | Surface | K | A | B | C | D | E |
| Lens 1 | S11 | | | | | | |
| | S12 | | | | | | |
| Lens 2 | S13 | −9.2287 | 0.0310 | −0.0086 | 0.0000 | 0.0023 | −0.0008 |
| | S14 | −10.0000 | 0.0305 | −0.0010 | −0.0071 | 0.0054 | −0.0013 |
| Stop | | | | | | | |
| Lens 3 | S15 | −6.2989 | 0.0109 | −0.0022 | 0.0002 | | |
| | S16 | −0.7398 | −0.0001 | 0.0000 | 0.0002 | | |
| Lens 4 | S17 | −0.7764 | 0.0411 | 0.0332 | −0.0146 | 0.0032 | −0.0003 |
| | S18 | −2.0601 | −0.0239 | 0.0163 | −0.0015 | −0.0005 | 0.0001 |

Figure 10:
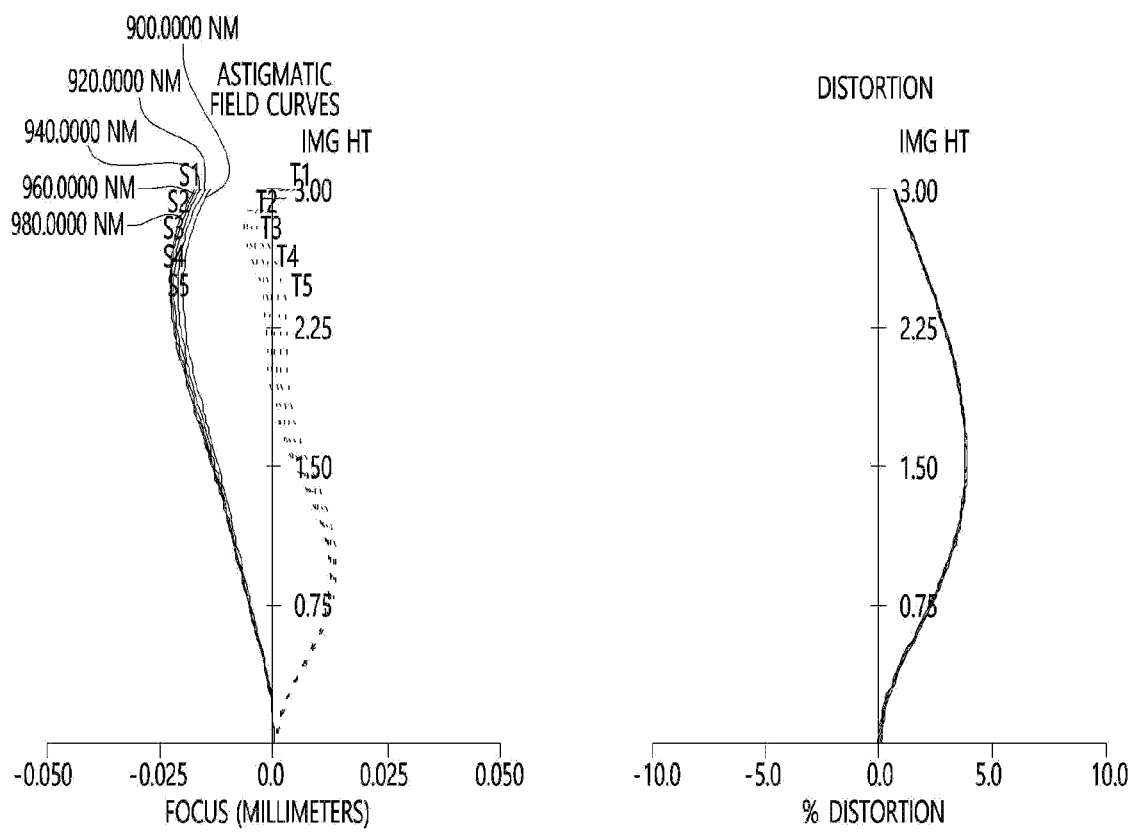
FIGS. 10 to 12 are diagrams showing astigmatic field curves and distortion graphs at room temperature, low temperature, and high temperature in the optical system of FIG. 9.
Figure 11:
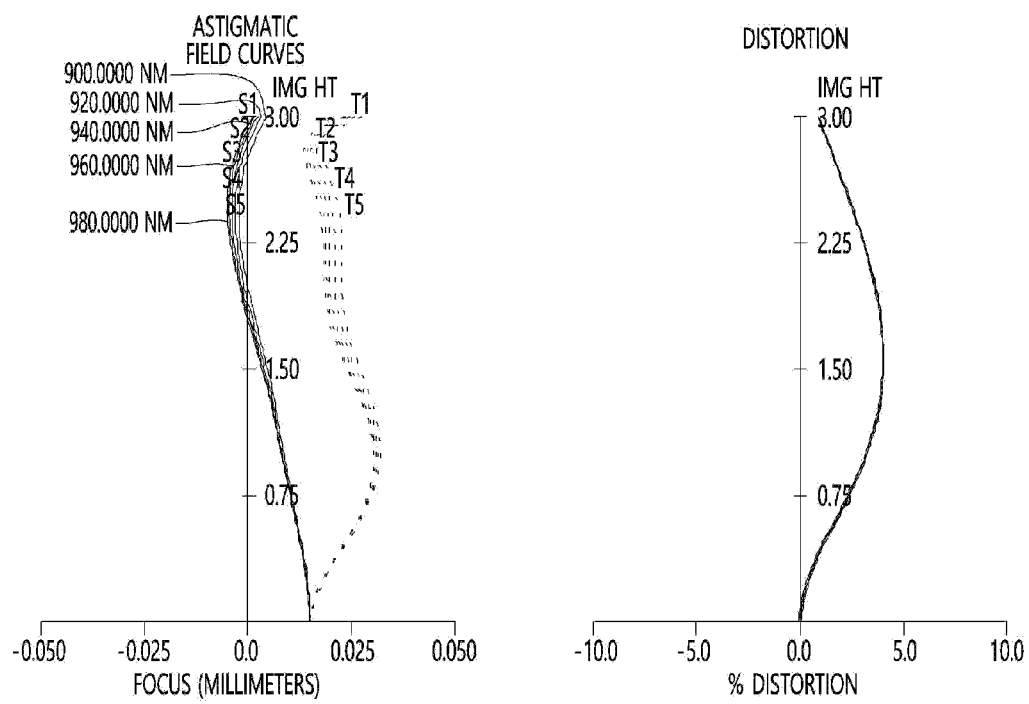
Figure 12:
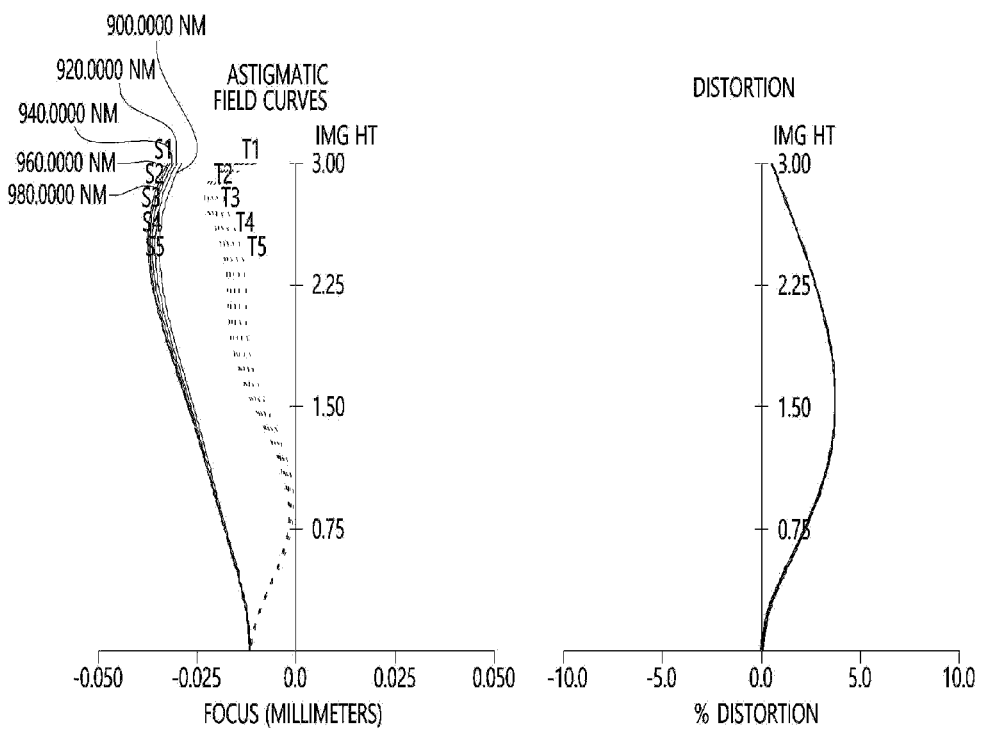
Figure 13:
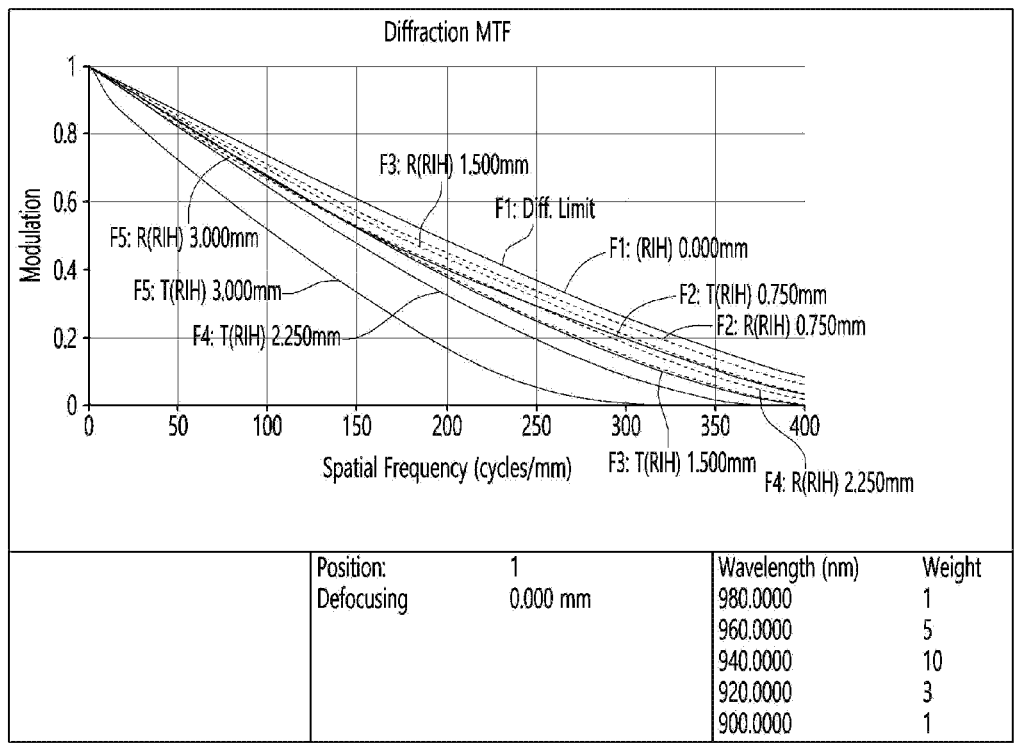
FIGS. 13 to 15 are graphs showing a diffraction MTF at room temperature, low temperature and high temperature in the optical system of FIG. 9.
Figure 14:
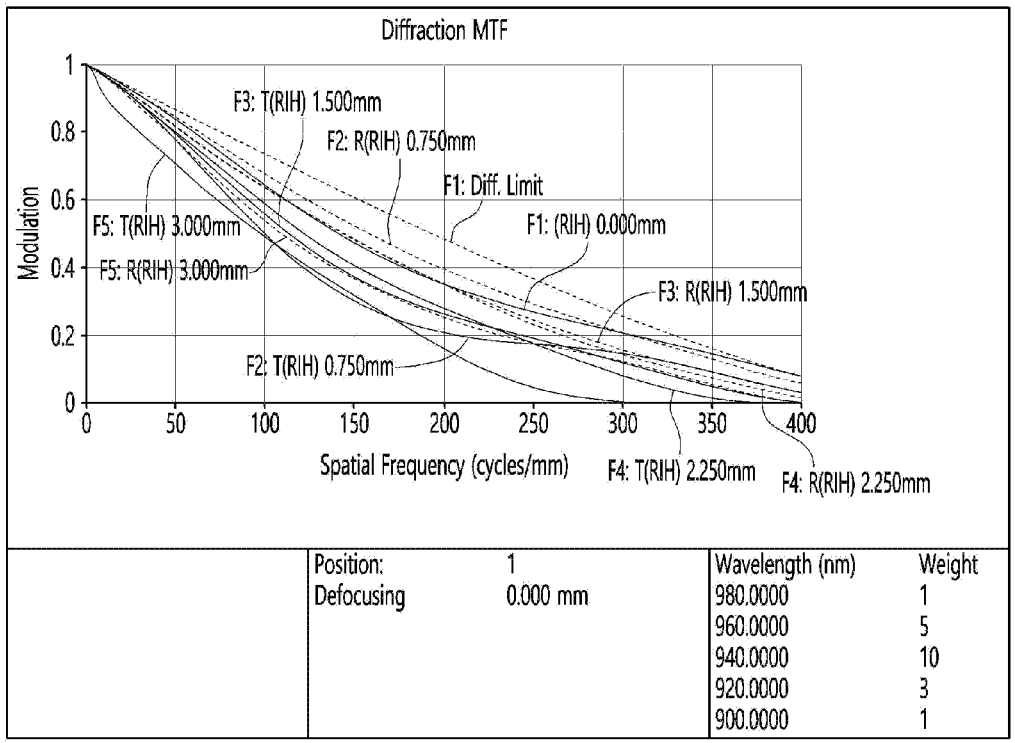
Figure 15:
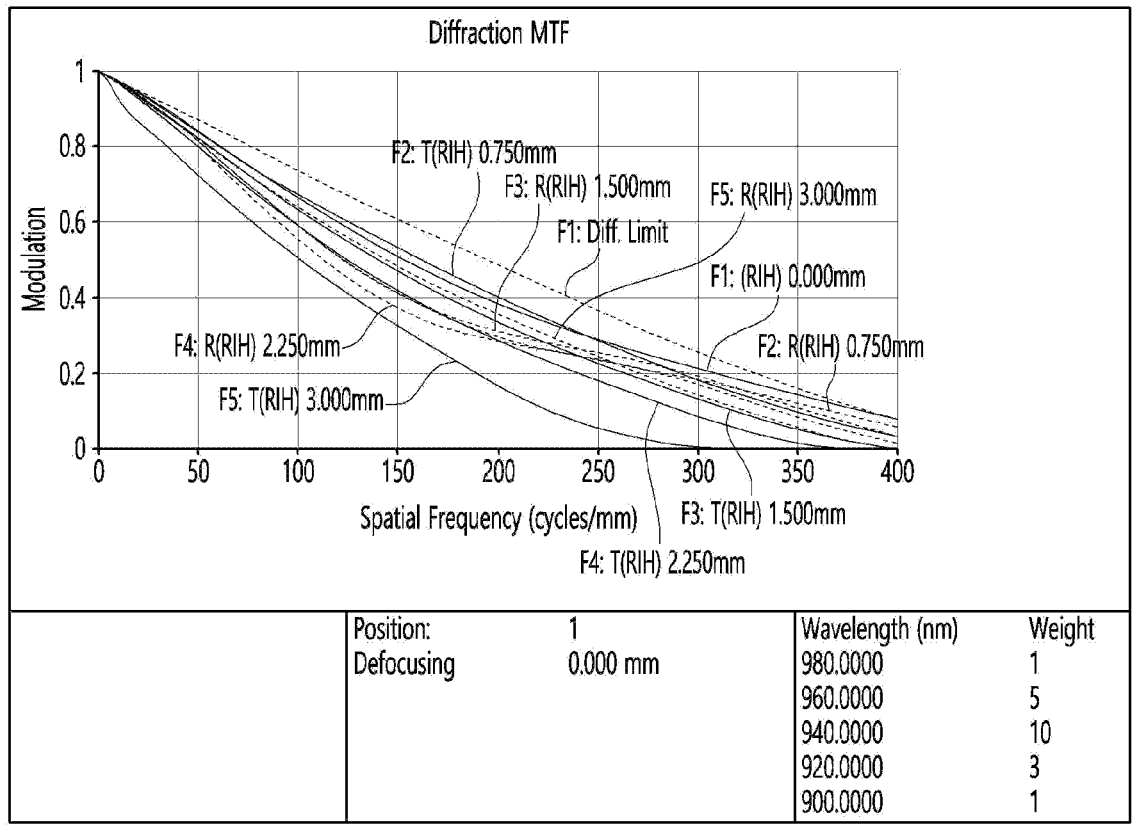

FIGS. 10 to 12 are diagrams showing astigmatic field curves and distortion graphs at room temperature, low temperature, and high temperature in the optical system of FIG. 9, and FIGS. 13 to 15 are graphs showing diffraction MTF (Modulation Transfer Function) at room temperature, low temperature and high temperature in the optical system of FIG. 9. Here, the normal temperature is 22 degrees, the low temperature is −40 degrees, and the high temperature is 80 degrees. As shown in FIGS. 10 to 12, it may be seen that there is no significant change in the astigmatic field curves at room temperature, low temperature, and high temperature, and no change in distortion graph at room temperature, low temperature, and high temperature. As shown in FIGS. 13 to 15, it may be seen that the diffraction MTF (Modulation transfer function) at room temperature, low temperature, and high temperature in the optical system is data when the aperture stop ST is open based on F1 (Diff Limit), and the change in the data according to the temperature change is not large, less than 10%. Referring to FIGS. 16 to 22 for the third embodiment.

Figure 16:
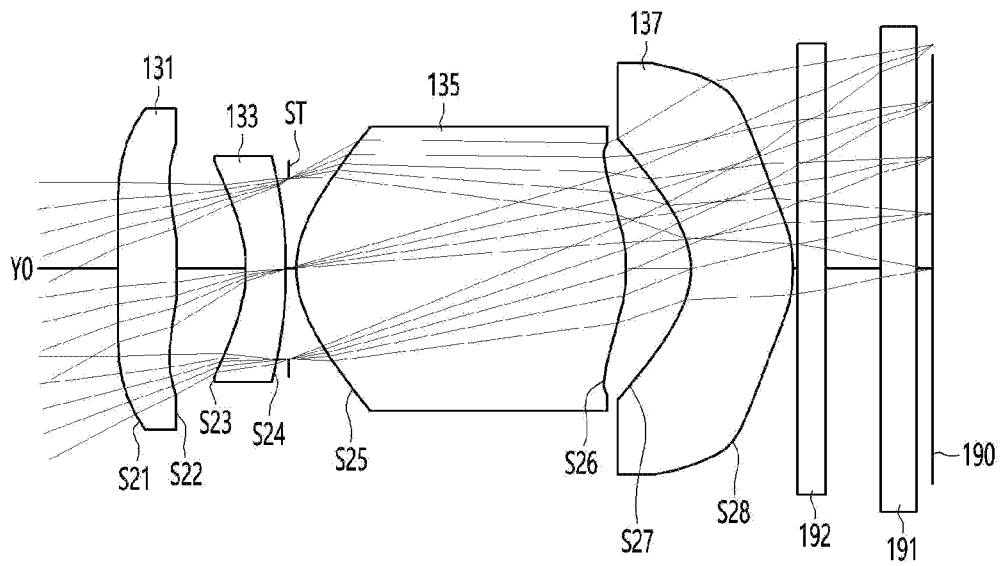
FIG. 16 is a side cross-sectional view showing an optical system for a vehicle according to a third embodiment of the invention.

Referring to FIG. 16, the optical system may include a first lens 131, a second lens 133, a third lens 135, and a fourth lens 137 stacked along the optical axis from the object side to the image side. The optical system or a camera module having the same may include an image sensor 190, a cover glass 191, and an optical filter 192 on the image sensor 190. The optical system may include an aperture stop ST for adjusting the amount of incident light. A lens group disposed on the object side with respect to the aperture stop ST may be divided into a first lens group and the lens group disposed on the image side with respect to the aperture stop ST may be divided into a second lens group. That is, the first lens group may include the first and second lenses 131 and 133, and the second lens group may include the third and fourth lenses 135 and 137. The aperture stop ST may be disposed on the outer circumference between the second lens 133 and the third lens 135, or the lower circumference of the second lens 133 or the upper circumference of the third lens 135 functions as an aperture stop.

The first lens 131 is a lens closest to the subject and may include a plastic material. The first lens 131 includes a first surface S21 on which light is incident and a second surface S22 on which light is emitted, and both the first surface S21 and the second surface S22 may be aspheric surfaces. The first lens 131 may have positive (+) refractive power, and may have a refractive index of less than 1.6, for example, in the range of 1.5 to 1.59. The first and third lenses 131 and 133 may have a lower refractive index than other lenses of the optical system. The first surface S21 of the first lens 131 may be convex toward the object side, and the second surface S22 may be convex toward the image side. At least one or both of the first surface S21 and the second surface S22 of the first lens 131 may have an inflection point. The first lens 131 may be made of plastic to prevent discoloration when the camera module is exposed to light from inside or outside the vehicle, and may be made of glass or plastic when the camera module is placed inside the vehicle. The first lens 131 is made of a plastic material and can increase the amount of incident light due to its aspheric surface.

The second lens 133 may be made of glass. The second lens 133 has a negative refractive power and may be formed of a material having a refractive index of 1.7 or more, for example, in the range of 1.7 to 1.8. The second lens 133 may be disposed between the first lens 131 and the third lens 135. The second lens 133 includes a third surface S23 on which light is incident and a fourth surface S24 on which light is emitted, and both the third surface S23 and the fourth surface S24 may be spherical surface. The third surface S23 may be concave toward the image side, and the fourth surface S4 may be convex toward the image side. The second lens 133 is made of glass and has a high refractive index and a high dispersion value, so that the aberration of incident light may be improved.

The third lens 135 may be made of a plastic material. The third lens 135 may have positive (+) refractive power and may be formed of a material having a refractive index of less than 1.6. The third lens 135 includes a fifth surface S25 through which light is incident and a sixth surface S26 through which light is emitted, and both the fifth surface S25 and the sixth surface S26 may be aspheric surfaces. The fifteenth surface S5 may be convex toward the object, and the sixteenth surface S6 may be convex toward the image side. Both sides of the third lens 135 may be convex on the optical axis. At least one or both of the fifth surface S25 and the sixth surface S26 of the third lens 135 may have at least one inflection point. For example, the sixth surface S26 may have an inflection point near the edge rather than the center. The center thickness of the third lens 135 may be thicker than that of other lenses. As another example, the third lens 135 may be made of glass.

The fourth lens 137 is a lens closest to the image sensor 190 and may be made of a plastic material. The fourth lens 137 may have positive (+) refractive power and may be formed of a material having a refractive index of 1.6 or more and less than 1.7. The fourth lens 137 includes a seventh surface S27 on which light is incident and an eighth surface S28 on which light is emitted, and both the seventh surface S27 and the eighth surface S28 may be aspheric surfaces. The seventh surface S27 may be concave toward the image side, and the eighth surface S28 may be convex toward the image side. The fourth lens 137 may have a meniscus shape convex toward the image side. At least one or both of the seventh surface S27 and the eighth surface S28 of the fourth lens 137 may have at least one inflection point. The fourth lens 137 may be made of glass.

Each of the lenses 131, 133, 135, and 137 may include an effective region having an effective diameter through which light is incident and a flange portion outside the effective region, which is an ineffective region. The ineffective region may be a region in which light is blocked by a spacer or a light blocking film. The effective diameter of the first lens 131 may be larger than that of the second lens 133 and smaller than that of the fourth lens 137. Here, the ratio of the lenses disposed on the image side of the aperture stop ST to the lenses disposed on the object side may be 1:1.

For the image sensor 190, the optical filter 192, and the cover glass 191, the description of the first embodiment will be referred to. In the vehicle camera module according to the third embodiment, there may be no driving member (not shown) around the optical system. That is, since the optical system is disposed in the vehicle, it is difficult to control the focus by moving the lens barrel supporting the optical system in the optical axis direction or/and in a direction perpendicular to the optical axis direction with the driving member, so the driving member may be removed. The driving member may be an actuator or a piezoelectric element for an auto focus (AF) function or/and an optical image stabilizer (OIS) function.

Table 5 shows lens data in the optical system of FIG. 16.

Abbe number of the first to fourth lenses 131, 133, 135, and 137 at d-line (587 nm), the Abbe numbers of the second lens 133 and the fourth lens 137 may be less than and the Abbe numbers of the first and third lenses 131 and 135 may be 50 or more. Abbe numbers of the first and third lenses 131 and 135 may be greater than Abbe numbers of the second and fourth lenses 133 and 137. Also, the distance between the first lens 131 and the second lens 133 on the optical axis Y0 may be greater than the distance between the third lens 135 and the fourth lens 137. The center thicknesses of the third and fourth lenses 135 and 137 may be 1 mm or more, the center thickness of the third lens 135 may be 3 mm or more, and the center thickness of the first and second lenses 131 and 133 may be less than 1 mm, and may be smaller than the center thickness of the fourth lens 137. When the focal lengths are compared as absolute values, the focal length of the first lens 131 may be larger than those of the second and third lenses 133 and 135 and smaller than the focal length of the fourth lens 137. Compared with the absolute value of the radius of curvature (unit, mm), the radius of curvature of the first surface S21 of the first lens 131 is the largest among lenses in the optical system, and may be mm or more, for example, in the range of 20 mm to 30 mm. The radius of curvature of the first surface S21 may be four or more times, for example, four to five times the radius of curvature of the fourth surface S24. The radius of curvature of the fourth surface S24 is greater than the radius of curvature of the second surface S22, and the radius of curvature of the second surface S22 may be greater than the radii of the curvature of the third, fifth, sixth, and seventh surfaces S23, S25, S26 and S27. The semi-aperture represents the effective radius of each lens. Comparing the effective radii, the effective radius of the eighth surface S28 of the fourth lens 137 may be the largest, and is larger than the effective radius of the first surface S21 of the first lens 131. The effective radius of the first surface S21 may be greater than the effective radius of the second, third, fourth, fifth, sixth, and seventh surfaces S22, S23, S24, S25, S26, and S27. The

TABLE 5

| | Surface | Shape | Radius of curvature (mm) | Thickness (mm)/ Distance (mm) | Refractive index (Nd) | Abbe number (Vd) | Focal length (mm) | semi-aperture (mm) |
|---|---|---|---|---|---|---|---|---|
| Object plane | 0 | Flat | 1.E+18 | 640.00 | | | | |
| Lens 1 | S21 | Asphere | −26.275 | 0.705 | 1.531 | 55.900 | 9.405 | 1.955 |
| | S22 | Asphere | −4.171 | 0.840 | | | | 1.689 |
| Lens 2 | S23 | Sphere | −1.411 | 0.500 | 1.671 | 27.850 | −2.655 | 1.374 |
| | S24 | Sphere | −5.942 | 0.050 | | | | 1.274 |
| Stop | | Flat | 1.E+18 | 0.080 | | | | 1.208 |
| Lens 3 | S25 | Asphere | 1.300 | 4.052 | 1.531 | 55.900 | 2.589 | 1.728 |
| | S26 | Asphere | −2.397 | 0.779 | | | | 1.681 |
| Lens 4 | S27 | Asphere | −0.972 | 1.279 | 1.671 | 19.200 | −23.586 | 1.749 |
| | S28 | Asphere | −1.573 | 0.050 | | | | 2.510 |
| BPF | Sa | Flat | 1.E+18 | 0.300 | 1.508 | 44.850 | | |
| | Sb | Flat | 1.E+18 | 0.600 | | | | |
| Cover glass | Sc | Flat | 1.E+18 | 0.400 | 1.508 | 44.850 | | |
| | Sd | Flat | 1.E+18 | 0.200 | | | | |
| Image sensor | | Flat | 1.E+18 | 0.000 | | | | |

In Table 5, Sa and Sb may be the incident-side and exit-side surfaces of the optical filter, and Sc and Sd may be the incident-side and exit-side surfaces of the cover glass. The refractive indices of the first to fourth lenses 131, 133, 135, and 137 is the refractive index at 587 nm, and in the eighth surface S28 of the fourth lens 127 may be 2 mm or more, and the effective radius of the other lenses may be less than 2 mm.

The optical system according to the third embodiment of the invention may include at least one glass lens and at least three plastic lenses. Among the total lenses in the optical system, glass-made lenses may account for 30% or less, for example, 25% or less, and plastic lenses may account for 70% or more, for example, 75% or more of the total lenses. Here, the lens disposed on the image side with respect to the aperture stop ST may have the convex object-side surface and the convex image-side surface, and may have positive (+) refractive power. When the lens disposed on the object side of the aperture stop ST is made of glass, it may have negative refractive power, and the lens disposed on the image side of the aperture stop ST may have positive (+) refractive power. When the lens disposed above the aperture stop ST is made of glass, the lens disposed on the object side with respect to the aperture stop ST may have a positive (+) refractive power, and the lens disposed above the aperture stop ST may have a positive (+) refractive power. The number of object-side lenses and the number of image-side lenses based on the aperture stop may be the same.

Table 6 is the aspherical surface coefficient of each lens surface in the optical system of FIG. 16.

TABLE 6

| | | Aspherical surface coefficient | | | | | |
|---|---|---|---|---|---|---|---|
| Item | Surface | K | A | B | C | D | E |
| | 0 | | | | | | |
| Lens 1 | S21 | −9.9610 | 0.0206 | −0.0035 | 0.0013 | −0.0001 | 0.0000 |
| | S22 | −10.0000 | 0.0458 | −0.0167 | 0.0069 | −0.0011 | 0.0000 |
| Lens 2 | S23 | | | | | | |
| | S24 | | | | | | |
| Stop | | | | | | | |
| Lens 3 | S25 | −6.0100 | 0.0271 | −0.0053 | 0.0019 | −0.0003 | 0.0000 |
| | S26 | −10.0000 | −0.0346 | 0.0341 | −0.0124 | 0.0023 | −0.0003 |
| Lens 4 | S27 | −0.9885 | 0.1783 | −0.0586 | 0.0070 | 0.0043 | −0.0025 |
| | S28 | −2.7970 | 0.0282 | 0.0044 | −0.0026 | −0.0001 | 0.0001 |

Figure 17:
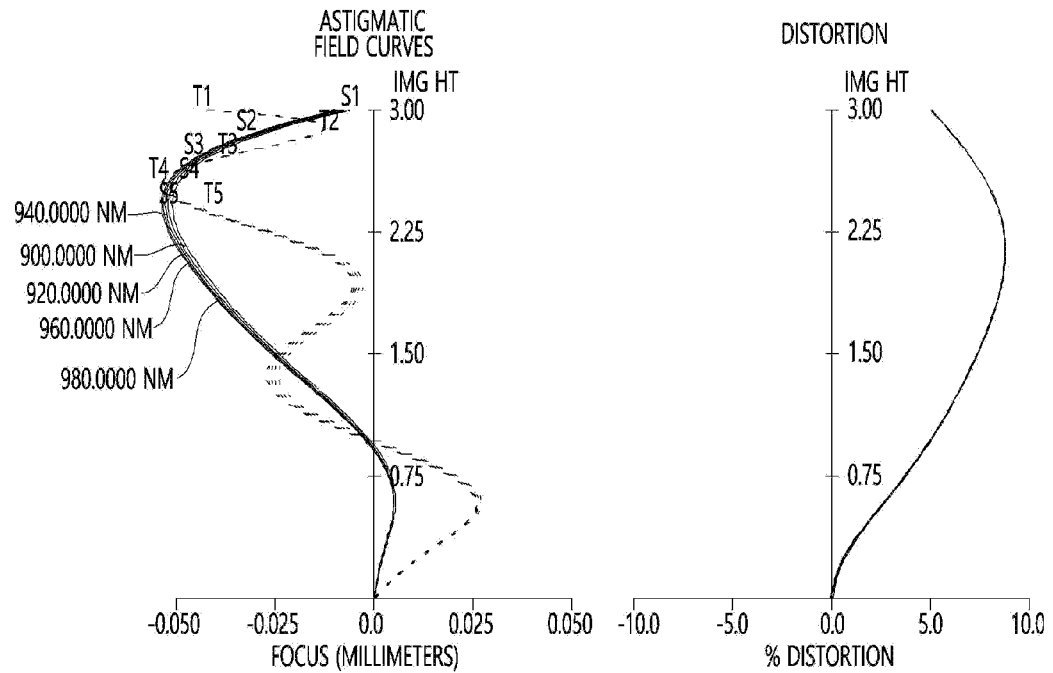
FIGS. 17 to 19 are diagrams showing astigmatic field curves and distortion graphs at room temperature, low temperature, and high temperature in the optical system of FIG. 16.
Figure 18:
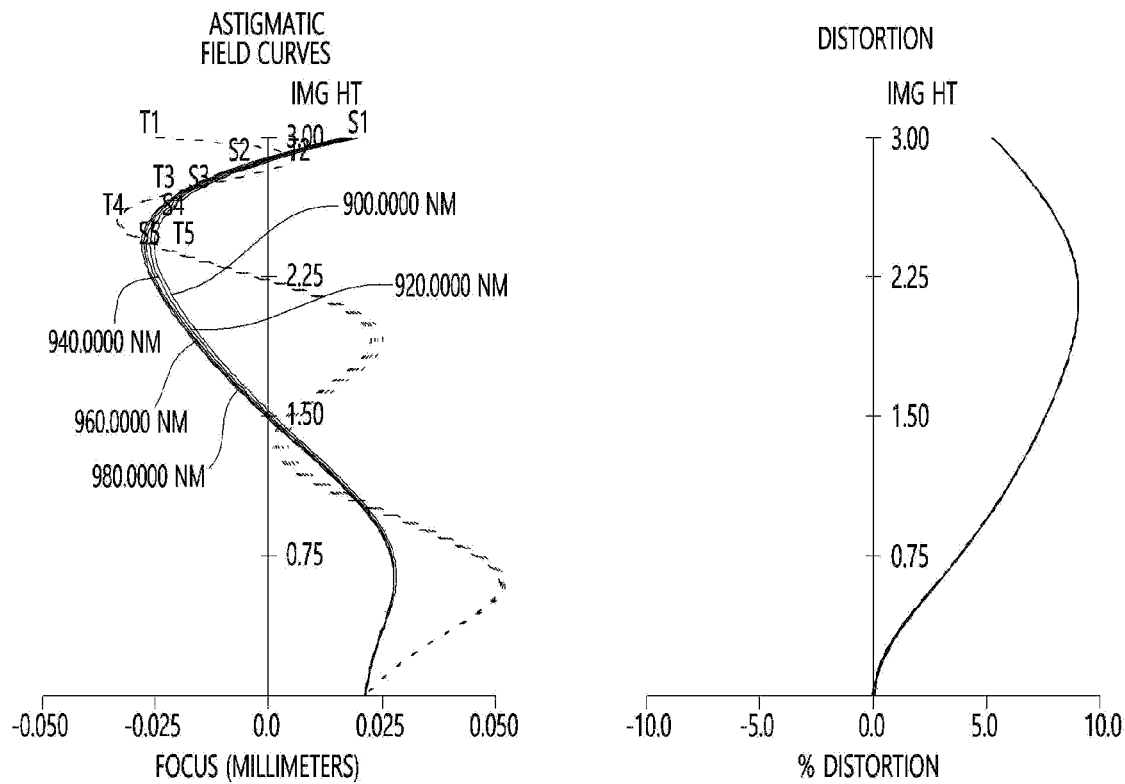
Figure 19:
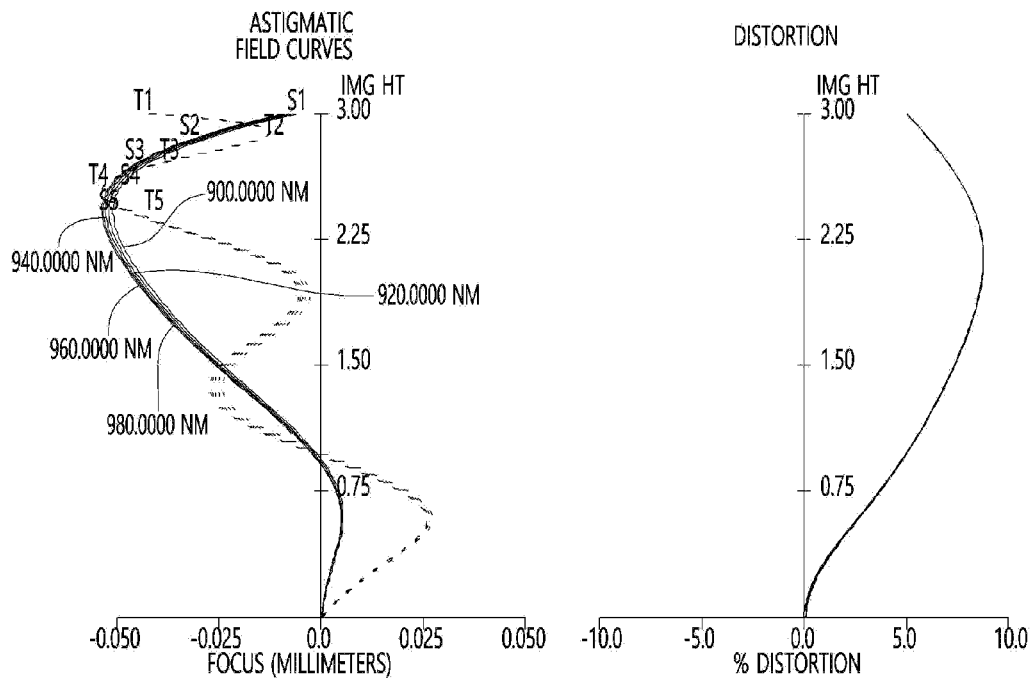
Figure 20:
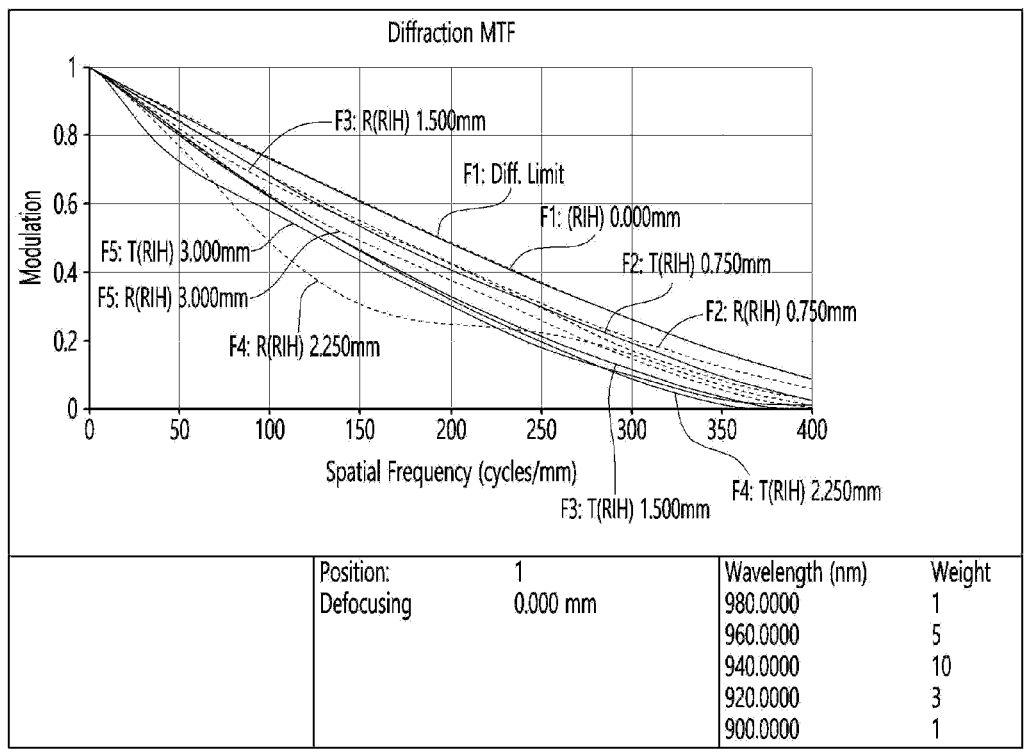
FIGS. 20 to 22 are graphs showing a diffraction MTF at room temperature, low temperature, and high temperature in the optical system of FIG. 16.
Figure 21:
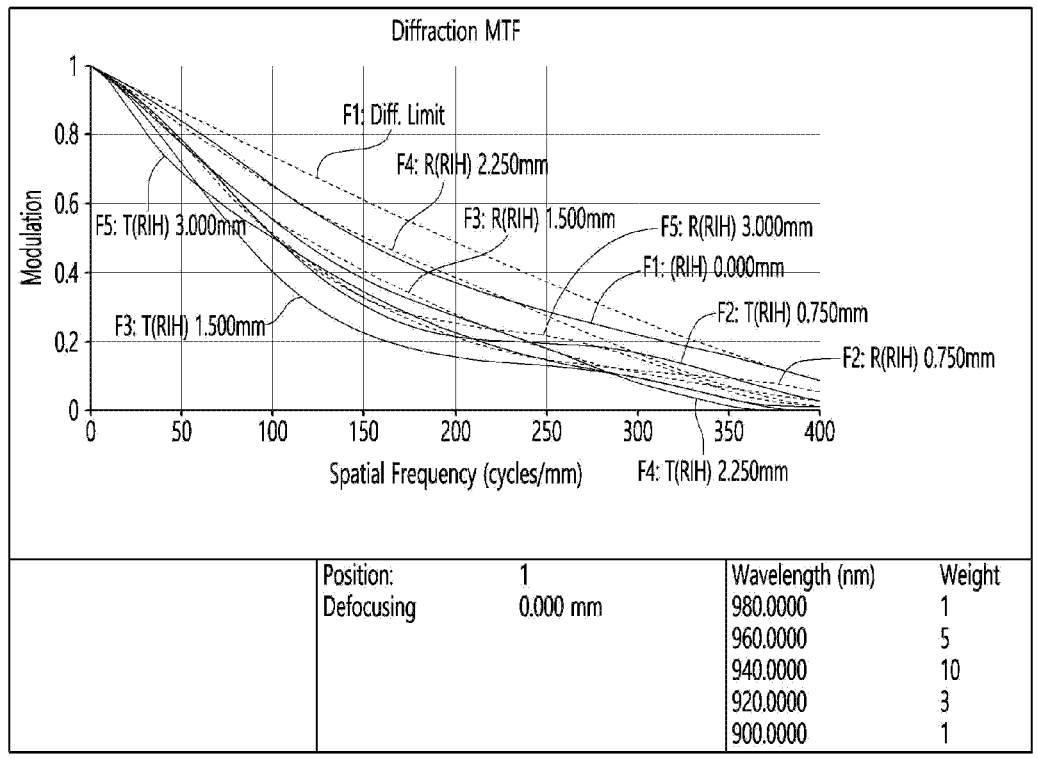
Figure 22:
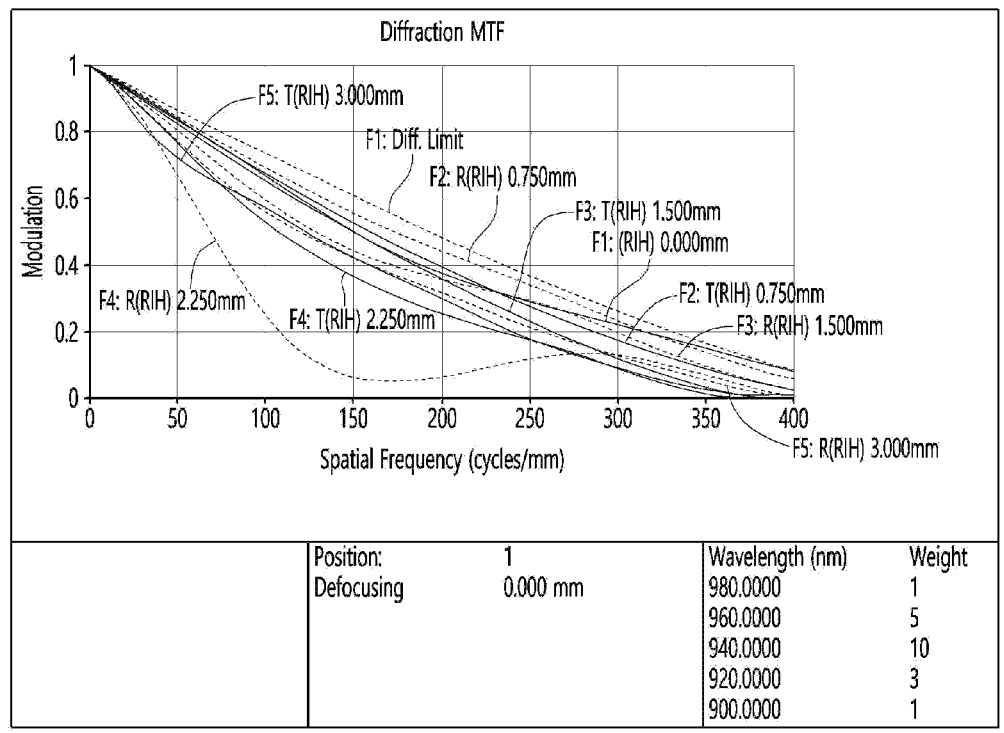

FIGS. 17 to 19 are diagrams showing astigmatic field curves and distortion graphs at room temperature, low temperature, and high temperature in the optical system of FIG. 16, and FIGS. 20 to 22 are diagrams showing diffraction MTF (Modulation Transfer Function) at room temperature, low temperature and high temperature in the optical system of FIG. 16. Here, the normal temperature is 22 degrees, the low temperature is −40 degrees, and the high temperature is 80 degrees. As shown in FIGS. 17 to 19, it may be seen that there is no significant change in the astigmatic field curves at room temperature, low temperature, and high temperature, and no change in distortion graph at room temperature, low temperature, and high temperature. As shown in FIGS. 20 to 22, it may be seen that the diffraction MTF (Modulation transfer function) at room temperature, low temperature, and high temperature in the optical system is data when the aperture stop ST is open based on F1 (Diff Limit), and the change in the data according to the temperature change is not large, less than 10%. Referring to FIGS. 23 to 29 for the fourth embodiment.

Figure 23:
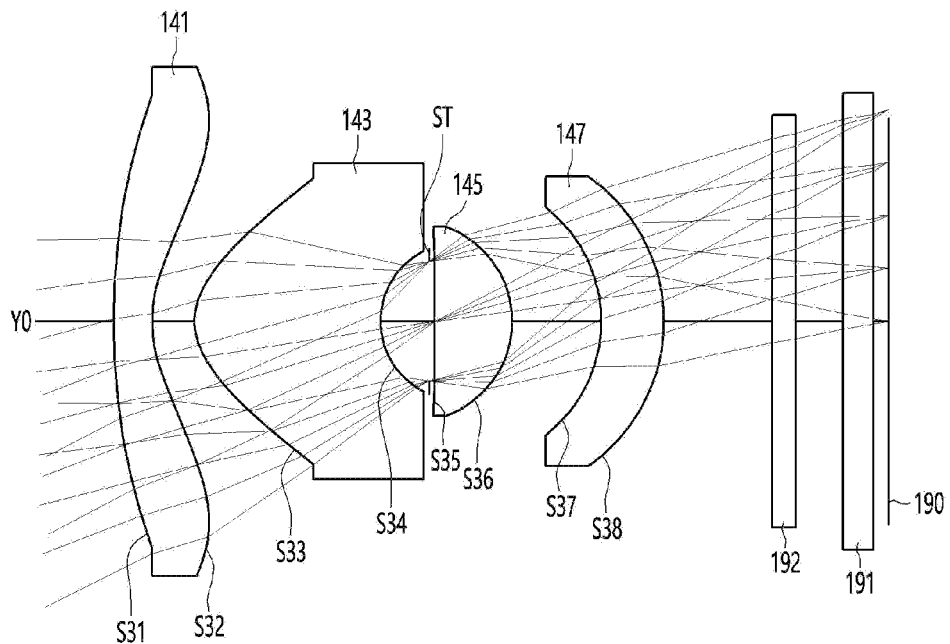
FIG. 23 is a side cross-sectional view showing an optical system for a vehicle according to a fourth embodiment of the invention.

Referring to FIG. 23, the optical system may include a first lens 141, a second lens 143, a third lens 145, and a fourth lens 147 stacked along the optical axis from the object side to the image side. The optical system or a camera module having the same may include an image sensor 190, a cover glass 191, and an optical filter 192 on the image sensor 190. The optical system may include an aperture stop ST for adjusting the amount of incident light. A lens group disposed on the object side with respect to the aperture stop ST may be divided into a first lens group and the lens group disposed on the image side with respect to the aperture stop ST may be divided into a second lens group. That is, the first lens group may include the first and second lenses 141 and 143, and the second lens group may include the third and fourth lenses 145 and 147. The aperture stop ST may be disposed on the outer circumference between the second lens 143 and the third lens 145, or the lower circumference of the second lens 143 or the upper circumference of the third lens 145 functions as an aperture stop.

The first lens 141 is a lens closest to the subject and may include a plastic material. The first lens 141 includes a first surface S31 on which light is incident and a second surface S32 on which light is emitted, and both the first surface S31 and the second surface S32 may be aspheric surfaces. The first lens 141 may have a negative (−) refractive power, and a refractive index of 1.6 or more, for example, in the range of 1.6 to 1.7. The first lens 141 may have a refractive index lower than that of the second and third lenses 143 and 145. The first surface S31 of the first lens 141 may be convex toward the object side, and the second surface S32 may be concave toward the object side. At least one or both of the first surface S31 and the second surface S32 of the first lens 141 may have an inflection point. The first lens 141 may be made of plastic to prevent discoloration when the camera module is exposed to light from inside or outside the vehicle, and may be made of glass or plastic when the camera module is placed inside the vehicle. The first lens 141 is made of a plastic material and may increase the amount of incident light due to its aspheric surface.

The second lens 143 may be made of a plastic material. The second lens 143 may have a positive (+) refractive power and may be formed of a material having a refractive index of less than 1.6, for example, in the range of 1.5 to 1.59. The second lens 143 may be disposed between the first lens 141 and the third lens 145. The second lens 143 includes a third surface S33 on which light is incident and a fourth surface S34 on which light is emitted, and both the third surface S33 and the fourth surface S34 may be aspheric surfaces. The third surface S33 may be convex toward the object side, and the fourth surface S4 may be concave toward the object side. The second lens 143 may have the thickest center portion among the lenses of the optical system.

The third lens 145 may be made of a plastic material. The third lens 145 has positive (+) refractive power and may be formed of a material having a refractive index of less than 1.6, for example, in the range of 1.5 to 1.59. The third lens 145 includes a fifth surface S35 on which light is incident and a sixth surface S36 on which light is emitted, and both the fifth surface S35 and the sixth surface S36 may be aspheric surfaces. The fifteenth surface S5 may be concave toward the image side, and the sixteenth surface S6 may be convex toward the image side. At least one or both of the fifth surface S35 and the sixth surface S36 of the third lens 145 may have at least one inflection point. For example, the sixth surface S36 may have an inflection point near the edge rather than the center. As another example, the third lens 145 may be made of glass.

The fourth lens 147 is a lens closest to the image sensor 190 and may be made of glass. The fourth lens 147 has positive (+) refractive power and may be formed of a material having a refractive index of 1.7 or higher, for example, in the range of 1.7 to 1.8. The fourth lens 147 includes a seventh surface S37 on which light is incident and an eighth surface S38 on which light is emitted, and both the seventh and eighth surfaces S37 and S38 may be spherical surfaces. The seventh surface S37 may be concave toward the image side, and the eighth surface S38 may be convex toward the image side. The fourth lens 147 may have a meniscus shape convex toward the image side. As another example, the fourth lens 147 may be made of a plastic material. The fourth lens 147 is made of glass and has a high refractive index and a high dispersion value, so that it may improve the aberration of incident light.

Each of the lenses 141, 143, 145, and 147 may include an effective region having an effective diameter through which light is incident and a flange portion outside the effective region, which is an ineffective region. The ineffective region may be a region in which light is blocked by a spacer or a light blocking film. The effective diameter of the first lens 141 may be larger than the effective diameters of the second, third, and fourth lenses 143, 145, and 147. Here, the ratio of the lenses disposed on the image side of the aperture stop ST to the lenses disposed on the object side may be 1:1.

For the image sensor 190, the optical filter 192, and the cover glass 191, the description of the first embodiment will be referred to. In the vehicle camera module according to the fourth embodiment, there may be no driving member (not shown) around the optical system. That is, since the optical system is disposed in the vehicle, it is difficult to control the focus by moving the lens barrel supporting the optical system in the optical axis direction or/and in a direction perpendicular to the optical axis direction with the driving member, so the driving member may be removed. The driving member may be an actuator or a piezoelectric element for an auto focus (AF) function or/and an optical image stabilizer (OIS) function.

Table 7 shows lens data in the optical system of FIG. 23.

TABLE 7

| | Surface | Shape | Radius of curvature (mm) | Thickness (mm)/ Distance (mm) | Refractive index (Nd) | Abbe number (Vd) | Focal length (mm) | semi-aperture (mm) |
|---|---|---|---|---|---|---|---|---|
| Object plane | 0 | Flat | 1.E+18 | 640.00 | | | | |
| Lens 1 | S31 | Asphere | 9.389 | 0.500 | 1.671 | 19.200 | −3.970 | 3.277 |
| | S32 | Asphere | 1.962 | 0.539 | | | | 3.032 |
| Lens 2 | S33 | Asphere | 1.153 | 2.386 | 1.531 | 55.900 | 2.926 | 2.029 |
| | S34 | Asphere | 1.368 | 0.644 | | | | 0.953 |
| Stop | | Flat | 1.E+18 | 0.079 | | | | 0.861 |
| Lens 3 | S35 | Asphere | 18825.873 | 0.979 | 1.531 | 55.900 | 3.299 | 0.933 |
| | S36 | Asphere | −1.720 | 1.150 | | | | 1.205 |
| Lens 4 | S37 | Sphere | −1.801 | 0.818 | 1.754 | 29.238 | 18.679 | 1.529 |
| | S38 | Sphere | −1.896 | 1.404 | | | | 1.857 |
| BPF | Sa | Flat | 1.E+18 | 0.300 | 1.508 | 44.850 | | |
| | Sb | Flat | 1.E+18 | 0.600 | | | | |
| Cover glass | Sc | Flat | 1.E+18 | 0.400 | 1.508 | 44.850 | | |
| | Sd | Flat | 1.E+18 | 0.200 | | | | |
| Image sensor | | Flat | 1.E+18 | 0.000 | | | | |

In Table 7, Sa and Sb may be the incident-side and exit-side surfaces of the optical filter, and Sc and Sd may be the incident-side and exit-side surfaces of the cover glass. The refractive indices of the first to fourth lenses 141, 143, 145, and 147 is the refractive index at 587 nm, and in the Abbe number of the first to fourth lenses 141, 143, 145, and 147 at d-line (587 nm), the Abbe numbers of the first lens 141 and the fourth lens 147 may be less than 30, and the Abbe numbers of the second and third lenses 143 and 145 may be 50 or more. Abbe numbers of the second and third lenses 143 and 145 may be greater than Abbe numbers of the first and fourth lenses 141 and 147. In addition, the distance between the first lens 141 and the second lens 143 on the optical axis is smaller than the distance between the second and third lenses 143 and 145, and may be smaller than the distance between the third lens 145 and the fourth lens 147. A distance between the third lens 145 and the fourth lens 147 on the optical axis may be 1 mm or more. The center thickness of the second lens 143 may be thicker than that of the third and fourth lenses 143 and 145 and may be 2 mm or more. A center thickness of the third and fourth lenses 143 and 145 may be greater than 0.6 mm and less than 1.1 mm. The center thickness of the first lens 141 may be less than 0.6 mm, and may be smaller than a distance between the first and second lenses 141 and 143 on the optical axis. Comparing the focal lengths as absolute values, the focal length of the first lens 141 may be larger than those of the second and third lenses 143 and 145 and smaller than that of the fourth lens 147. Compared with the absolute value of the radius of curvature (unit, mm), the radius of curvature of the first surface S31 of the first lens 141 is the second largest among lenses in the optical system, and may be in the range of 8 mm or more, for example, in a range of 8 mm to 12 mm. The radius of curvature of the first surface S31 may be 5 times or more, for example, in a range of 5 to 8 times the radius of curvature of the fourth surface S34. The radius of curvature of the fourth surface S34 may be smaller than the radius of curvature of the second surface S32, and the radius of curvature of the second surface S32 may be greater than the radii of curvature of the third, sixth, and seventh surfaces S23, S26, and S27. The radius of curvature of the fifth surface S35 may be the radius of curvature of a horizontal surface, and may be greater than or equal to 1000 mm, for example, in a range of 1000 mm to 3000 mm. The semi-aperture represents the effective radius of each lens. Comparing the effective radii, the effective radius of the first surface S31 of the first lens 147 may be the largest and larger than that of the second surface S32, and the effective radius of the second surface S32 may be larger than the effective radii of the third, fourth, fifth, sixth, seventh, and eighth surfaces S32, S33, S34, S35, S36, S37, and S38. The radii of curvature of the fourth and fifth surfaces S34 and S35 may be 1 mm or less, and the radii of curvature of the sixth, seventh and eighth surfaces S36, S37 and S38 may be greater than 1 mm.

The optical system according to the fourth embodiment of the invention may include at least one glass lens and at least three plastic lenses. Among the total lenses in the optical system, glass-made lenses may account for 30% or less, for example, 25% or less, and plastic lenses may account for 70% or more, for example, 75% or more of the total lenses. Here, the lens disposed on the image side with respect to the aperture stop ST may have the convex object-side surface and the convex image-side surface, and may have positive (+) refractive power. When the lens disposed on the object side of the aperture stop ST is made of glass, it may have negative refractive power, and the lens disposed on the image side of the aperture stop ST may have positive (+) refractive power. When the lens disposed above the aperture stop ST is made of glass, the lens disposed on the object side with respect to the aperture stop ST may have a positive (+) refractive power, and the lens disposed on the image side of the aperture stop ST may have a positive (+) refractive power. The number of object-side lenses and the number of image-side lenses may be the same based on the aperture stop.

Table 8 is the aspherical surface coefficient of each lens surface in the optical system of FIG. 23.

TABLE 8

| Item | Sur-face | Aspherical surface coefficient | | | | |
|---|---|---|---|---|---|---|
| | | K | A | B | C | D | E |
| Lens 1 | S31 | 1.9413 | 0.0011 | −0.0002 | | | |
| | S32 | −4.9589 | −0.0036 | −0.0001 | | | |
| Lens 2 | S33 | −0.8771 | −0.0523 | 0.0185 | −0.0048 | 0.0005 | 0.0001 |
| | S34 | 0.7108 | 0.0405 | −0.0430 | 0.0533 | −0.0403 | −0.0025 |
| Stop | | | | | | | |
| Lens 3 | S35 | 10.0000 | −0.0182 | −0.0169 | 0.0131 | −0.0210 | −0.0017 |
| | S36 | 0.8240 | 0.0127 | −0.0130 | 0.0186 | −0.0153 | 0.0053 |
| Lens 4 | S37 | | | | | | |
| | S38 | | | | | | |

Figure 24:
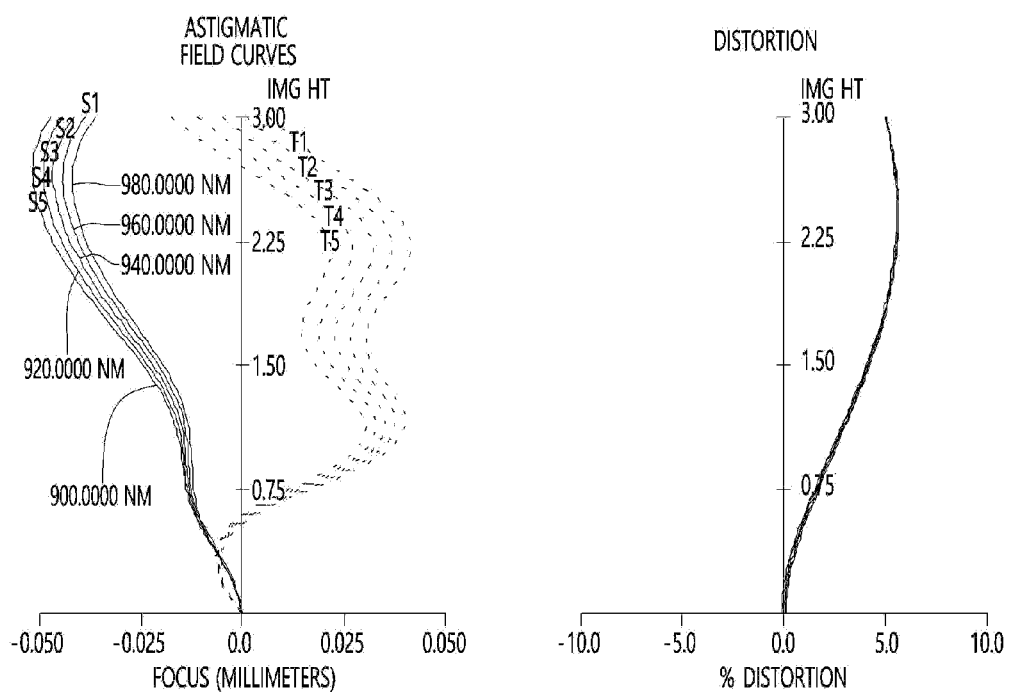
FIGS. 24 to 26 are diagrams showing astigmatic field curves and distortion graphs at room temperature, low temperature, and high temperature in the optical system of FIG. 23.
Figure 25:
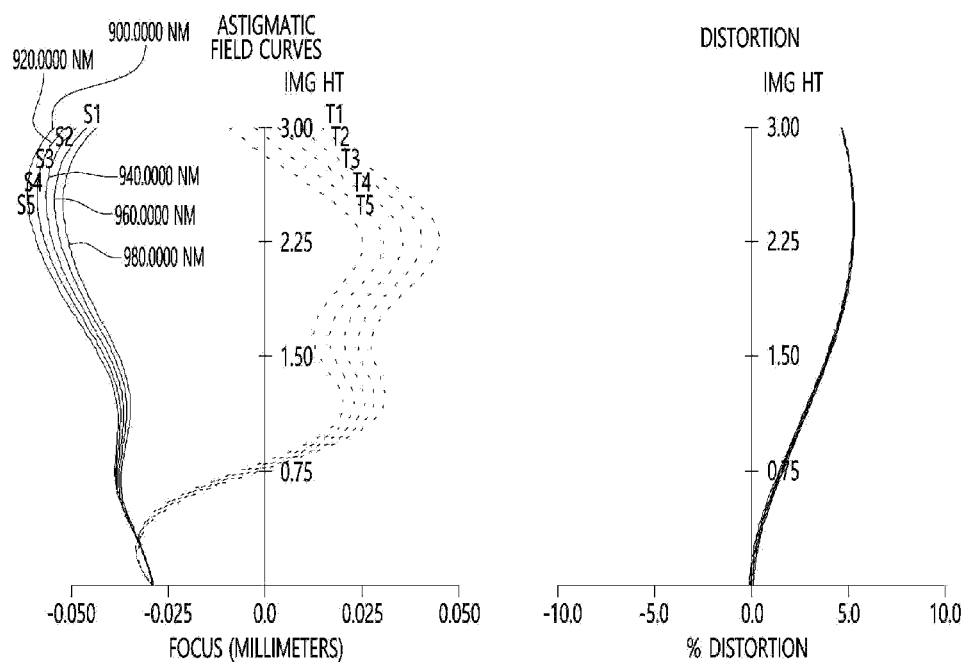
Figure 26:
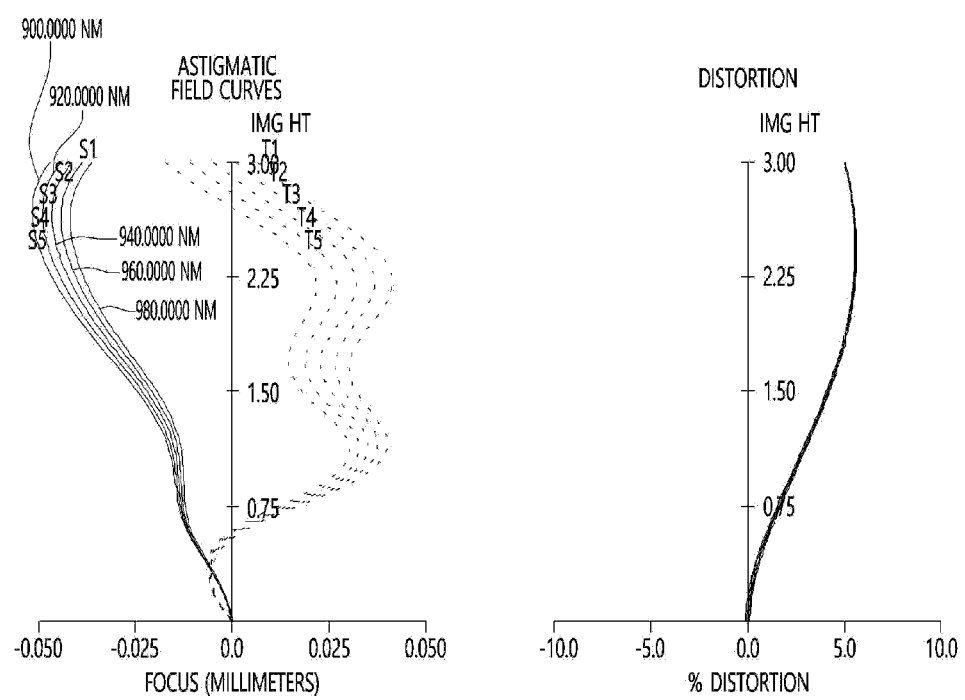
Figure 27:
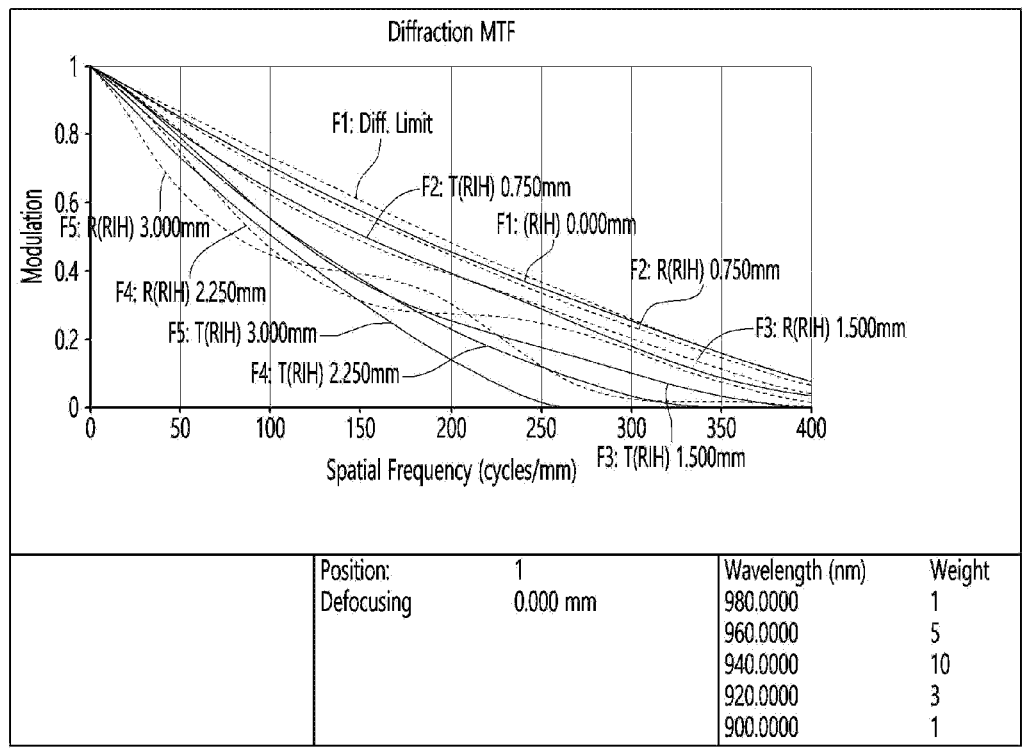
FIGS. 27 to 29 are graphs illustrating diffraction MTF at room temperature, low temperature, and high temperature in the optical system of FIG. 23.
Figure 28:
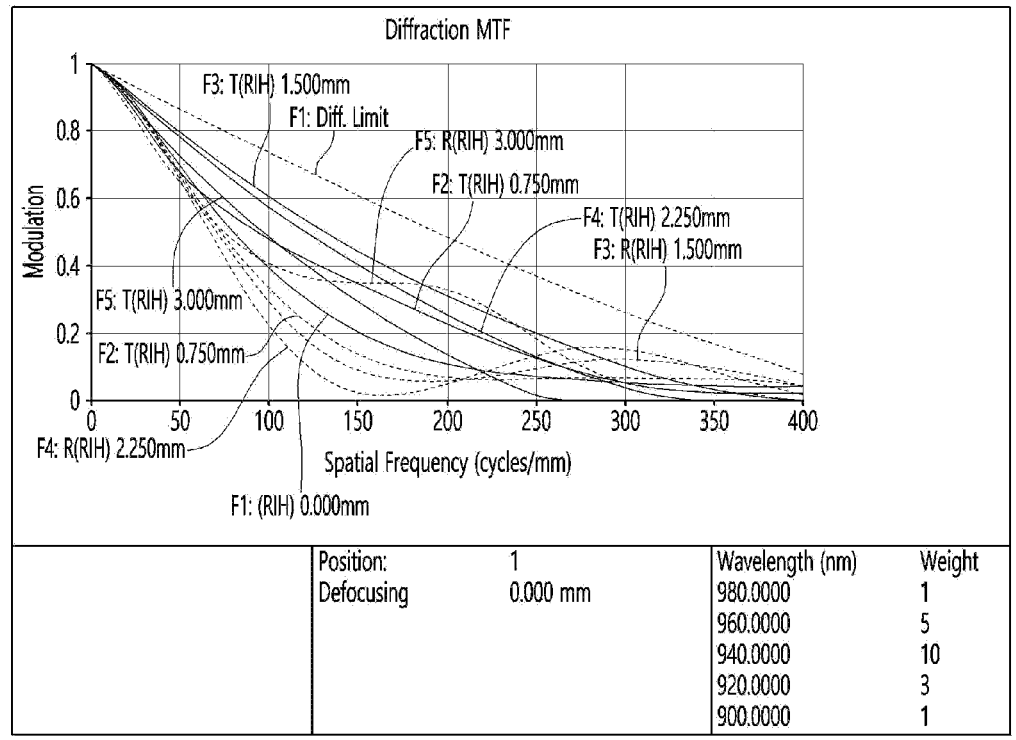
Figure 29:
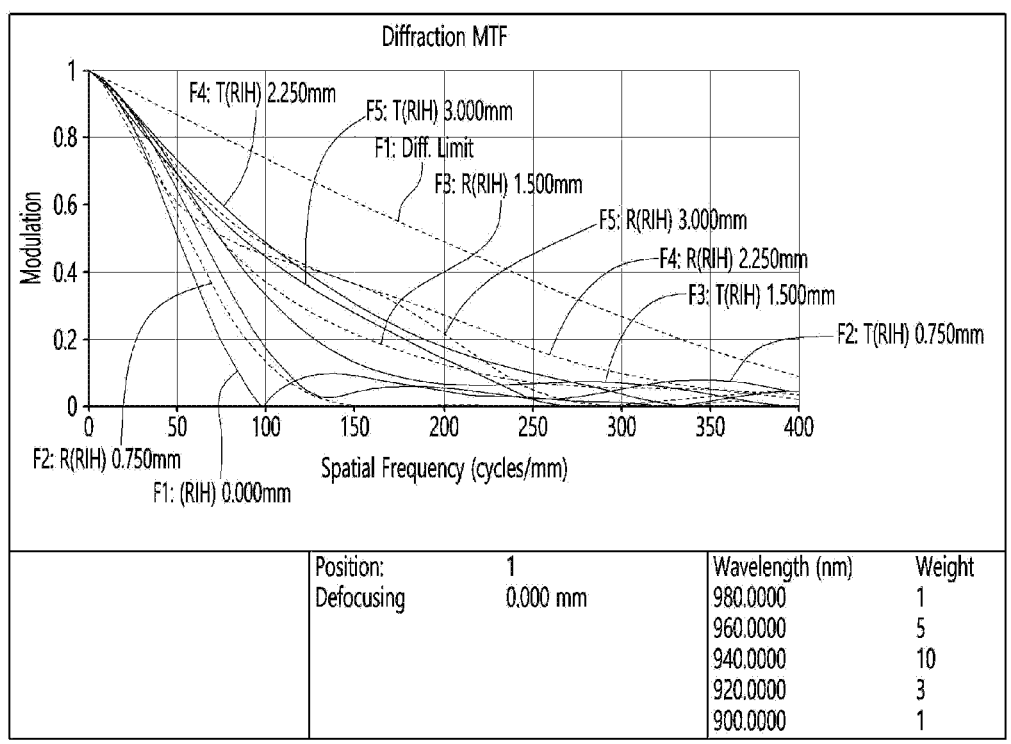

FIGS. 24 to 26 are diagrams showing astigmatic field curves and distortion graphs at room temperature, low temperature, and high temperature in the optical system of FIG. 23, and FIGS. 27 to 29 are graphs showing diffraction MTF (Modulation Transfer Function) at room temperature, low temperature and high temperature in the optical system of FIG. 23. Here, the room temperature is 22 degrees, the low temperature is −40 degrees, and the high temperature is 80 degrees. As shown in FIGS. 24 to 26, it may be seen that there is no significant change in the astigmatic field curves at room temperature, low temperature, and high temperature, and no change in distortion graph at room temperature, low temperature, and high temperature. As shown in FIGS. 27 to 29, it may be seen that the diffraction MTF (Modulation transfer function) at room temperature, low temperature, and high temperature in the optical system is data when the aperture stop ST is open based on F1 (Diff Limit), and the change in the data according to the temperature change is not large, less than 10%. In the embodiment of the invention, the lens disposed on the image side with respect to the aperture stop ST, that is, the third lenses 115, 125, 135, and 145 have convex object-side fifth surface and convex image-side sixth surface, and may have positive (+) refractive power. When the lens disposed on the object side of the aperture stop ST, that is, the second lenses 113, 123, 133, and 143 are made of glass, and may have negative refractive power, and the lenses disposed on the image side, that is, the third lenses 115, 125, 135, and 145 may have positive (+) refractive power. When the lens disposed on the image side of the aperture stop ST, that is, the third lenses 115, 125, 135, and 145 are made of glass, the second lenses 113, 123, 133, and 143 disposed on the object side may have positive (+) refractive power and the third lenses 115, 125, 135, and 145 disposed on the image side may have positive (+) refractive power. The lens barrel disposed around each lens of the optical system according to an embodiment of the invention is formed of a metal material, for example, an aluminum material, and may effectively dissipate heat generated from the internal lenses. In addition, the angle of field of view in the optical system may be 50 degrees or more, for example, in a range of 50 degrees to 80 or in a range of 55 degrees to 65 degrees, and the effective focal length may be 3 mm or more, for example, in a range of 3 mm to 6 mm. In addition, the change in MFT may be less than 10% when the temperature of the vehicle or the optical system ranges from low to high (−40 degrees to 80 degrees).

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is merely an example and does not limit the invention, and those of ordinary skill in the art will understand that various modifications and applications not exemplified are possible without departing from the essential characteristics of the present embodiment. For example, each component specifically shown in the embodiment can be implemented by modification. And differences related to such modifications and applications should be construed as being included in the scope of the invention defined in the appended claims.

The invention claimed is:
1. An optical system comprising:
a first lens, a second lens, a third lens, and a fourth lens sequentially stacked along an optical axis from an object side to an image side,
wherein an aperture stop is disposed on an outer circumference between the second lens and the third lens,
wherein the first lens includes an object-side first surface and an image-side second surface, wherein the second lens includes an object-side third surface and an image-side fourth surface, wherein the third lens includes an object-side fifth surface and an image-side sixth surface, wherein the fifth surface and the sixth surface of the third lens arranged on the image side with respect to the aperture stop are convex on the optical axis, wherein the first surface of the first lens on the optical axis is convex toward the object side, wherein the third lens has a positive refractive power, wherein the fourth lens has a positive refractive power, wherein the fourth lens has a concave object-side seventh surface and a convex image-side eighth surface on the optical axis, wherein one of the first to fourth lenses is made of glass, and at least one other is made of plastic, wherein the second surface of the first lens is concave on the optical axis, and wherein the second lens has the third surface concave and the fourth surface concave on the optical axis.

2. The optical system of claim 1, wherein the third lens is made of glass, and the first, second and fourth lenses are made of plastic.

3. The optical system of claim 1, wherein the first lens is made of glass, and the second to fourth lenses are made of plastic.

4. The optical system of claim 1, wherein the second lens is made of glass, and the first, third and fourth lenses are made of plastic.

5. The optical system of claim 1, wherein the fourth lens is made of glass, and the first to third lenses are made of plastic.

6. A camera module comprising:
the optical system according to claim 1;
an image sensor;
a cover glass between the image sensor and the fourth lens; and
an optical filter between the cover glass and the fourth lens.

7. An optical system comprising:
a first lens, a second lens, a third lens, and a fourth lens sequentially stacked along an optical axis from an object side to an image side, wherein an aperture stop is disposed on an outer circumference between the second lens and the third lens, wherein the first lens includes an object-side first surface and an image-side second surface, wherein the second lens includes an object-side third surface and an image-side fourth surface, wherein the third lens includes an object-side fifth surface and an image-side sixth surface, wherein the fifth surface and the sixth surface of the third lens arranged on the image side with respect to the aperture stop are convex on the optical axis, wherein the first surface of the first lens on the optical axis is convex toward the object side, wherein the third lens has a positive refractive power, wherein the fourth lens has a positive refractive power, wherein the fourth lens has a concave object-side seventh surface and a convex image-side eighth surface on the optical axis, wherein one of the first to fourth lenses is made of glass, and at least one other is made of plastic, wherein the second lens has a negative refractive power, and wherein the first lens has a positive refractive power.

8. A camera module comprising:
the optical system according to claim 7;
an image sensor;
a cover glass between the image sensor and the fourth lens; and
an optical filter between the cover glass and the fourth lens.

9. An optical system comprising:
a first lens, a second lens, a third lens, and a fourth lens sequentially disposed along an optical axis from an object side to an image side, wherein an aperture stop is disposed on an outer circumference between the second lens and the third lens, wherein the first lens includes an object-side first surface and an image-side second surface, wherein the second lens includes an object-side third surface and an image-side fourth surface, wherein the third lens includes an object-side fifth surface and an image-side sixth surface, wherein the fifth surface and the sixth surface of the third lens arranged on the image side with respect to the aperture stop are convex on the optical axis, wherein the first surface of the first lens is convex toward the object side on the optical axis, wherein the third lens has a positive refractive power, wherein the fourth lens has a positive refractive power, wherein the second lens has a negative refractive power, and wherein the first lens has a positive refractive power, wherein the fourth lens has a concave object-side seventh surface and a convex image-side eighth surface on the optical axis, and wherein the object surface and the image-side surface of one of the first to fourth lenses are spherical surface, and the object-side surface and the image-side surface of at least one of the other lenses are an aspheric surface.

10. The optical system of claim 9, wherein the third lens is made of glass, and the first, second and fourth lenses are made of plastic.

11. A camera module comprising:
the optical system according to claim 9;
an image sensor;
a cover glass between the image sensor and the fourth lens; and
an optical filter between the cover glass and the fourth lens.

* * * * *